(12) United States Patent
Leonard et al.

(10) Patent No.: US 10,830,307 B2
(45) Date of Patent: Nov. 10, 2020

(54) VIBRATION ISOLATOR AND SYSTEMS INCLUDING SAME

(71) Applicant: Firestone Industrial Products Company, LLC, Nashville, TN (US)

(72) Inventors: Joshua R. Leonard, Noblesville, IN (US); Pradipta N. Moulik, Carmel, IN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 0 days.

(21) Appl. No.: 16/654,549

(22) Filed: Oct. 16, 2019

(65) Prior Publication Data

US 2020/0049228 A1 Feb. 13, 2020

Related U.S. Application Data

(63) Continuation of application No. 15/023,331, filed as application No. PCT/US2014/057878 on Sep. 26, 2014, now abandoned.
(Continued)

(51) Int. Cl.
*F16F 15/14* (2006.01)
*F16F 15/131* (2006.01)
*F16D 3/12* (2006.01)

(52) U.S. Cl.
CPC ............ *F16F 15/1457* (2013.01); *F16D 3/12* (2013.01); *F16F 15/13157* (2013.01);
(Continued)

(58) Field of Classification Search
CPC ... F16D 3/12; F16F 15/13157; F16F 15/1457; F16F 2228/063; F16F 2228/066; F16F 15/126; F16F 15/131
See application file for complete search history.

(56) References Cited

U.S. PATENT DOCUMENTS

| 2,174,342 A * | 9/1939 | Greulich .................. F16D 3/12 464/39 |
| 2,833,131 A * | 5/1958 | Miller ...................... F16D 3/80 464/28 |

(Continued)

FOREIGN PATENT DOCUMENTS

| DE | 19628853 B4 | 1/1997 |
| DE | 19641695 | 4/1998 |

(Continued)

OTHER PUBLICATIONS

EPO Machine Translation of DE 102010052147 (A1), Eugen et al., Sep. 6, 2011 (Year: 2011).*

(Continued)

*Primary Examiner* — Vinh Luong

(57) ABSTRACT

Vibration isolators can be dimensioned for securement between a rotational motion source and a rotational motion target. The vibration isolators can include a first end member and a second end member supported in substantially-fixed axial position but axially-rotatable relative to the first end member. An intermediate member can be disposed between and operatively engaging the first and second end members. A rotational motion-to-axial motion conversion system is operatively disposed between the intermediate member and the first end member such that rotation of the intermediate member and the second end member generates axial displacement of the intermediate member relative to the first and second end members. A biasing element can be operatively disposed between the intermediate member and one or more of the first and second end members to bias the intermediate member in an axial direction. Rotary power transmissions or system are also included.

20 Claims, 13 Drawing Sheets

Related U.S. Application Data

(60) Provisional application No. 61/908,042, filed on Nov. 23, 2013, provisional application No. 61/883,666, filed on Sep. 27, 2013.

(52) U.S. Cl.
CPC ... *F16F 2228/063* (2013.01); *F16F 2228/066* (2013.01); *F16F 2230/0064* (2013.01)

(56) References Cited

U.S. PATENT DOCUMENTS

| | | | |
|---|---|---|---|
| 3,584,714 A | | 6/1971 | Ryswick |
| 5,957,027 A | * | 9/1999 | Gilbert .................. B62D 5/083 137/625.23 |
| 9,770,960 B2 | * | 9/2017 | Leonard ................ B60G 99/00 |
| 2013/0161150 A1 | | 6/2013 | McCrary |
| 2014/0155180 A1 | | 6/2014 | Leonard |
| 2015/0008627 A1 | * | 1/2015 | Leonard ................... F16F 7/09 267/64.24 |
| 2015/0080135 A1 | * | 3/2015 | Torno ....................... F16D 3/12 464/62.1 |
| 2015/0380144 A1 | | 12/2015 | Heravi |
| 2017/0227086 A1 | * | 8/2017 | Lopez Perez ......... F16F 15/131 |
| 2017/0314654 A1 | | 11/2017 | Fuller |

FOREIGN PATENT DOCUMENTS

| | | | |
|---|---|---|---|
| DE | 102010052147 | | 6/2011 |
| DE | 102012221269 | | 6/2013 |
| DE | 102014208129 A1 | | 12/2014 |
| EP | 1661801 | | 5/2006 |
| GB | 23494 | * | 10/1910 |
| GB | 2510317 B | | 8/2014 |
| WO | WO 96/27747 | | 9/1996 |
| WO | WO 2015/048560 A9 | * | 4/2015 |

OTHER PUBLICATIONS

Define conical disc spring—Google Search, Dec. 30, 2019 (Year: 2019).*
EPO Machine Translation of DE 102014208129 of Triller et al., Apr. 12, 2014 (Year: 2014).*
Machine Translation of German Patent Office Action dated Sep. 3, 2019 in corresponding German Appl. No. DE 112014004415.0 (Year: 2019).*
International Search Report and Written Opinion for corresponding PCT Application No. PCT/US2014/057878 dated Jan. 15, 2015.
Office Action issued by German Patent Office dated Sep. 3, 2019 in connection with corresponding German Patent Application No. DE 11 2014 004 415.6.

* cited by examiner

VIBRATION ISOLATOR AND SYSTEMS INCLUDING SAME

This application is a continuation of U.S. patent application Ser. No. 15/023,331, filed on Mar. 18, 2016, which is the National Stage of International Application No. PCT/US 2014/057878, filed on Sep. 26, 2014, which claims the benefit of priority from U.S. Provisional Patent Application No. 61/883,666, filed on Sep. 27, 2013 and U.S. Provisional Patent Application No. 61/908,042, filed on Nov. 23, 2013, the entire contents of each of which is hereby incorporated herein by reference.

BACKGROUND

The subject matter of the present disclosure broadly relates to the art of rotational and/or torsional couplers and, more particularly, to vibration isolators that are operative to transmit rotational and/or torsional loads while reducing transmission of rotational and/or torsional vibrations between driving and driven components. A rotary power transmissions or systems including one or more of such vibration isolators are also included.

It will be appreciated that the subject matter of the present disclosure is capable of broad application and use in connection with a variety of applications and/or environments in which rotational and/or torsional motion is transferred from a driving component to a driven component. Non-limiting examples of environments in which vibration isolators in accordance with the subject matter of the present disclosure are suitable for use can include light-duty (e.g., automotive) and heavy-duty (e.g., tractor and/or trailer) motor vehicle applications, industrial machinery and equipment applications, agricultural and farm machinery applications, marine power and drive applications, aeronautical applications, and/or power generation (e.g., wind turbine, gas turbine and electrical generator) applications.

In known drivetrain designs, power is often transmitted from one component to another through rotary motion in which torque is applied by a driving component to a corresponding driven component. Constructions of a wide variety of types, kinds, configurations and arrangements have been developed for use in transmitting such rotational and/or torsional motion, such as belt/pulley arrangements, sprocket/chain arrangements, mating gears, and rotary and/or torsional couplings, for example. In many cases, vibrations and/or other undesirable vibratory inputs can be generated by or otherwise communicated from the driving component to the driven component, such as, for example, may be due to imbalances or variations in the power generating device, imbalances or variations in the driving component, imbalances or variations in the driven component and/or misalignment between the driving and driven components.

In some cases, existing designs for rotational and/or torsional couplers, such as dual mass and centrifugal pendulum flywheel constructions, for example, have been used in an attempt to damp vibrations between driving and driven components. However, such designs are often deemed to provide effective damping over only a limited range of frequencies of vibration. In other cases, the transmission of undesirable vibrations could potentially be reduced through the use of a less rigid or otherwise more-compliant connection between the driving and driven components. However, torsional transmissions are typically sized or otherwise designed to withstand torsional loads within a particular load range and to maintain the desired level of performance at least within that load range. In many cases, reducing the rigidity or otherwise increasing the compliance of the torsional connection can result in a decrease in performance and/or other disadvantageous issues.

Notwithstanding the widespread usage and overall success of the wide variety of rotational and/or torsional transmission constructions that are known in the art, it is believed that a need exists to meet the foregoing and/or other competing goals while still providing comparable or improved performance, ease of manufacture, ease of assembly, ease of installation, reduced cost of manufacture and/or otherwise advancing the art of rotational and/or torsional coupling devices.

BRIEF SUMMARY

One example of a vibration isolator in accordance with the subject matter of the present disclosure is dimensioned for securement between an associated rotational motion source and an associated rotational motion target. The vibration isolator can include a first end member and a second end member that is operatively connected to the first end member. The first and second end members can be supported in a substantially-fixed axial position relative to one another while remaining rotatable relative to one another. An intermediate member can be disposed between and can operatively engage the first and second end members. The intermediate member can be supported on one of the first end member and the second end member. Additionally, the intermediate member can be axially displaceable relative to the first and second end members. The intermediate member can be operatively connected in a substantially fixed rotational orientation relative to one of the first end member and the second end member such that the intermediate member and the one of the first and second end members can co-rotate relative to the other of the first and second end members. The vibration isolator can include a cam and follower system operatively disposed between the intermediate member and the other of the first and second end members such that rotation of the intermediate member and the one of the first and second end members generates axial displacement of the intermediate member relative to the first and second end members. The vibration isolator can also include one or more axially-acting elements that can be operatively disposed between the intermediate member and at least one of the first end member and the second end member to bias the intermediate member in an axial direction toward the other of the first and second end members and/or damp or otherwise dissipate kinetic energy acting on the intermediate member.

Another example of a vibration isolator in accordance with the subject matter of the present disclosure is dimensioned for securement between an associated rotational motion source and an associated rotational motion target with at least one of the associated rotational motion source and the associated rotational motion target being rotatable at an angular speed having a corresponding frequency of vibration. The vibration isolator can include a first end member and a second end member that is operatively connected to the first end member. The second end member can be supported in a substantially-fixed axial position relative to the first end member while remaining rotatable relative to the first end member. An intermediate member can be disposed between and can operatively engage the first and second end members. The intermediate member can be supported on one of the first end member and the second end member. Additionally, the intermediate member can be axially displaceable relative to the first and second end members. The intermediate member can be operatively connected in a substantially fixed rotational orientation relative to the second end member such that the intermediate member and the second end member can co-rotate relative to the first end member. The torsional vibration isolator can include a system operatively disposed between the intermediate member and the first end member to convert rotation of the intermediate member and the second end member relative to the first end member into axial displacement of the intermediate member relative to the first and second end members. The torsional vibration isolator can also include one or more biasing elements that can be operatively disposed between the intermediate member and at least one of the first end member and the second end member to bias the intermediate member in an axial direction toward the first end member. In some cases, the one or more biasing elements can, optionally, have a spring rate suitable for isolating at least one harmonic of the corresponding frequency of vibration. Additionally, or in the alternative, the torsional vibration isolator can include one or more damper elements that can be operatively disposed between the intermediate member and at least one of the first end member and the second end member to damp or otherwise dissipate kinetic energy acting on the intermediate member.

A further example of a vibration isolator in accordance with the subject matter of the present disclosure is dimensioned for securement between an associated rotational motion source and an associated rotational motion target. At least one of the associated rotational motion source and the associated rotational motion target can be rotatable at an angular speed having a corresponding frequency of vibration. The vibration isolator can include a first end member and a second end member that is operatively connected to the first end member. The second end member can be supported in a substantially-fixed axial position relative to the first end member while remaining rotatable relative to the first end member. An intermediate member can be operatively disposed between the first and second end members. The intermediate member can be supported on one of the first end member and the second end member. Additionally, the intermediate member can be axially displaceable relative to the first and second end members. The intermediate member can be operatively connected in a substantially fixed rotational orientation relative to the second end member such that the intermediate member and the second end member can co-rotate relative to the first end member. The torsional vibration isolator can include one or more biasing elements that can be operatively disposed between the intermediate member and at least one of the first end member and the second end member to bias the intermediate member in an axial direction upon relative rotation between the first end member and the co-rotating intermediate member and second end member. The torsional vibration isolator can include a system operatively disposed between the intermediate member and the first end member to convert rotation of the intermediate member and the second end member relative to the first end member into axial displacement of the intermediate member relative to the first and second end members.

In some cases, such systems can include one or more cam surfaces and one or more cam followers that abuttingly engage a corresponding cam surface.

In other cases, such systems can include one or more helical threads formed along the first end member and a corresponding one or more helical threads formed along the intermediate member. The one or more helical threads of the first end member and the intermediate member can be disposed in facing relation to one another. In some cases, the helical threads can abuttingly interengage one another such that a threaded connection is formed therebetween. In other cases, one or more bearing elements, such as one or more ball bearings, for example, can be at least partially disposed within a helical thread formed along the first end member and a corresponding helical thread formed along the intermediate member. In a preferred arrangement, the helical threads and one or more ball bearings can form a ball screw-style connection between the first end member and the intermediate member.

One example of a rotary power transmission in accordance with the subject matter of the present disclosure includes a rotational motion source and a rotational motion target capable of rotation at an angular speed having a corresponding frequency of vibration. The rotary power transmission can also include a vibration isolator in accordance with any of the foregoing paragraphs operatively connected between the rotational motion source and the rotational motion. In some cases, the vibration isolator can, optionally, be operative to isolate at least one harmonic of the corresponding frequency of vibration.

BRIEF DESCRIPTION OF THE DRAWINGS

FIG. 12 is an enlarged view of the portion of the vibration isolator identified as Detail 12 in FIG. 10.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
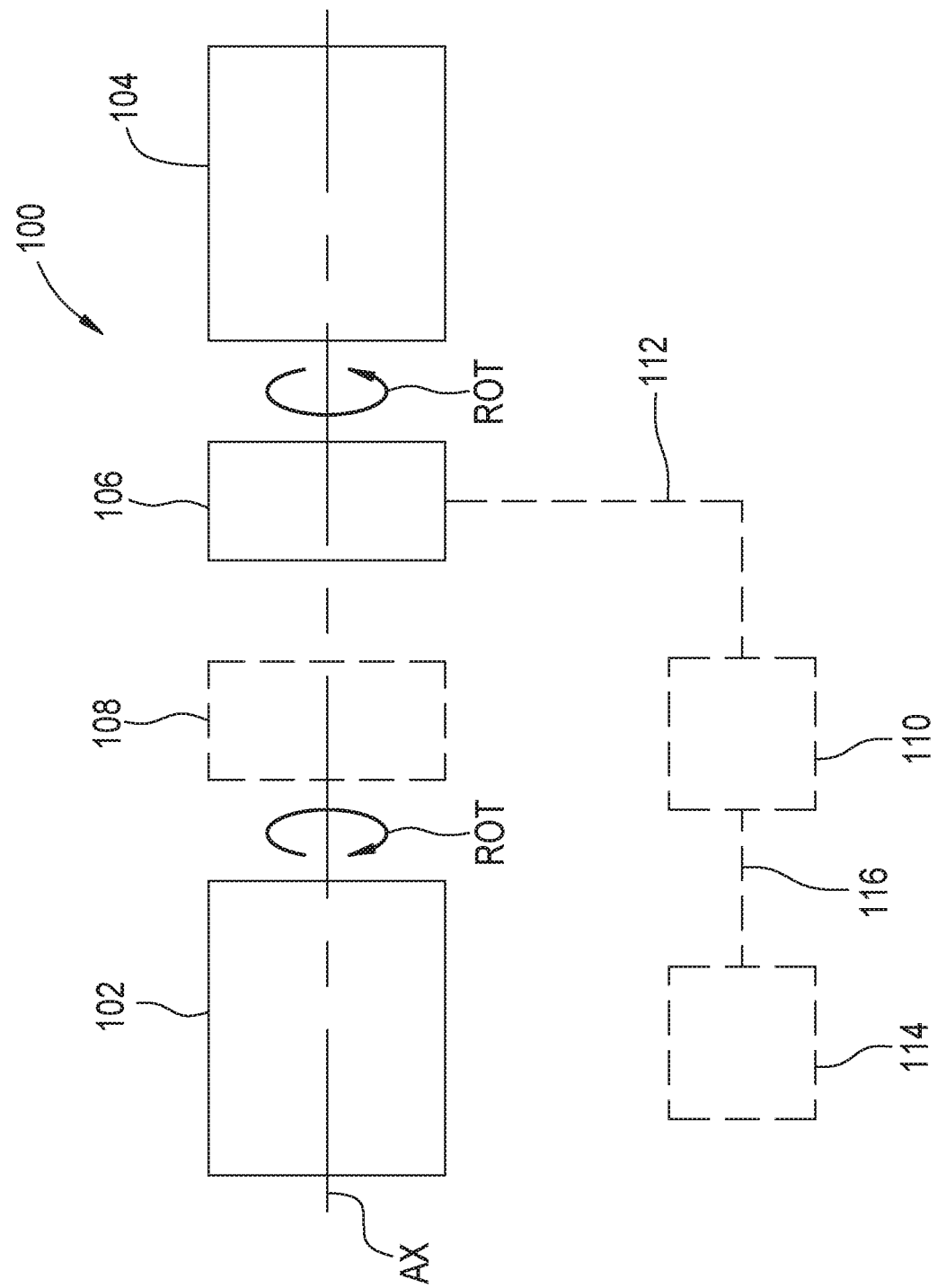
FIG. 1 is schematic representation of a rotary power transmission or system including a vibration isolator in accordance with the subject matter of the present disclosure.
Figure 2:
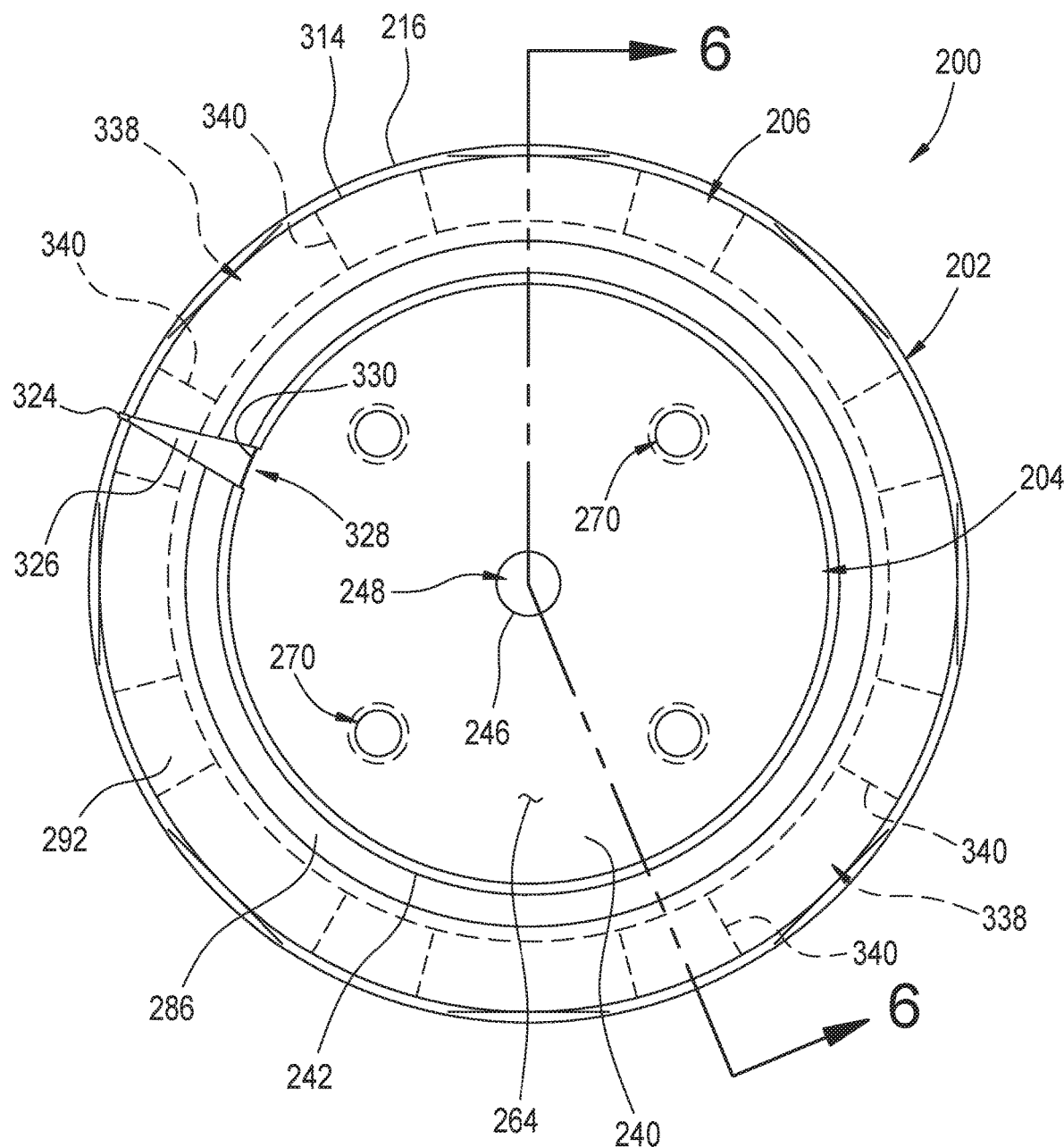
FIG. 2 is a front elevation view of one example of a vibration isolator in accordance with the subject matter of the present disclosure.

FIG. 1 illustrates one example of a rotary power transmission or system 100 that includes a rotational motion source (which may also be referred to herein as a driving component) 102, a rotational motion target (which may also be referred to herein as a driven component) 104, and one or more vibration isolators 106 in accordance with the subject matter of the present disclosure operatively disposed between the rotational motion source and the rotational motion target. In some cases, a vibration isolator in accordance with the subject matter of the present disclosure can be alternately referred to herein as a rotational vibration isolator and/or a torsional vibration isolator. As such, rotational motion about an axis AX can be transmitted from rotational motion source 102 to rotational motion target 104, as is represented by arrows ROT in FIG. 1. It will be appreciated that such rotational motion can be in any direction of rotation and can operate within any suitable range of angular speeds, such as within a range of from approximately 1 RPM to approximately 50,000 RPM, for example. Additionally, it will be appreciated that such rotational motion can have any corresponding natural or other frequencies of rotational vibration associated with any such range of angular speeds.

A vibration isolator in accordance with the subject matter of the present disclosure can function to isolate and/or otherwise reduce the transmission of torque oscillations and/or other rotational vibrations between the driving and driven components. In many cases, such torque oscillations and/or other rotational vibrations may be attributed to non-constant torque generation by the driving component and/or non-constant load generation by the driven component. Broadly, a vibration isolator in accordance with the subject matter of the present disclosure can isolate or otherwise reduce the transmission of torque oscillations and/or other rotational vibrations by converting the torque oscillations and/or other rotational vibrations into axial oscillations and/or other linear vibrations. That is, a vibration isolator in accordance with the subject matter of the present disclosure can convert relative rotational motion into relative axial motion, which can be damped and/or isolated to reduce the transmission of torque oscillations and/or other rotational vibrations between the driving and driven components. Damping of such axial oscillations and/or other linear vibrations can be achieved in any suitable manner, such as through the use of any suitable combination of one of more axially-acting damping elements. Isolation and/or reduced transmission of such axial oscillations and/or other linear vibrations can be achieved in any suitable manner, such as by isolating one or more harmonics of a natural or other frequency of vibration corresponding to a rotational speed of the driving and/or driving components.

In some cases, one or more additional components can, optionally, be operatively connected between vibration isolator 106 and one or more of rotational motion source 102 and rotational motion target 104, such as is represented by (optional) component 108, for example. Non-limiting examples of such an additional component (e.g., component 108) can include one or more additional vibration isolators, such as may be tuned for isolation of different frequencies or ranges of frequencies of rotational vibration, for example. Additionally, or in the alternative, such one or more additional components can include one or more clutches, one or more torque converters, one or more transmission components (e.g., gear sets, chain/sprocket sets, sheave/belt sets) and/or any combination thereof.

Additionally, rotational power transmission 100 can include one or more additional components and/or systems, such as may provide additional features and/or performance characteristics in connection with the operation and/or use of the rotational power transmission system and/or the one or more vibration isolators thereof. For example, vibration isolator 106 can, in some cases, include one or more features and/or components that utilize pressurized gas. In such cases, rotational power transmission 100 can, optionally, include or can, optionally, be otherwise operatively associated with a pressurized gas system 110, such as may include a pressurized gas source (e.g., a compressor), a pressurized gas storage device (e.g., a reservoir) and/or a pressurized gas control device (e.g., a valve), for example. Such a pressurized gas system, if provided, can be operatively connected with vibration isolator 106 in any suitable manner, such as is represented in FIG. 1 by dashed line 112, for example. Furthermore, rotational power transmission 100 can, optionally, include or can, optionally, be otherwise operatively associated with a control system 114, such as may be adapted to selectively operate one or more components and/or features of pressurized gas system 110, for example. Such a control system, if provided, can be operatively connected with pressurized gas system 110, if provided, in any suitable manner, such as is represented in FIG. 1 by dashed line 116, for example.

It will be appreciated that the subject matter of the present disclosure is capable of broad use in a wide variety of applications and/or environments. Non-limiting examples of such applications and/or environments can include automotive applications, heavy-duty trucking applications, rail applications, marine applications, aeronautical applications, electrical power generation and/or industrial applications. As such, non-limiting examples of rotational motion sources or driving components can include electric motors, pneumatic motors, internal combustion engines, transmissions, and output components (e.g., output shafts and/or connections) thereof. Non-limiting examples of rotational motion targets or driven components can include electrical generators, transmissions, gearboxes, driveshafts and input components (e.g., input shafts, gears and/or connections) thereof.

Figure 3:
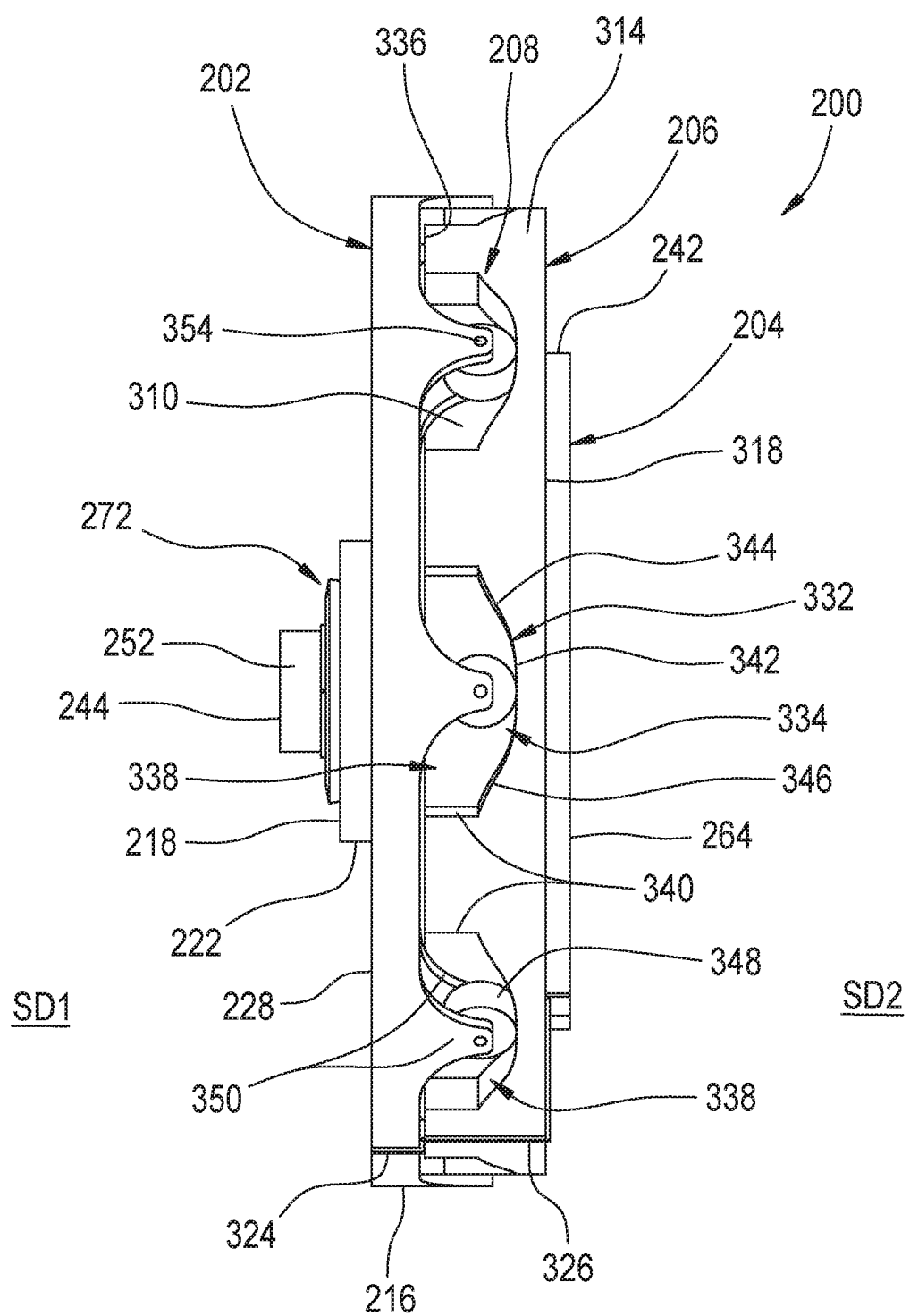
FIG. 3 is a side elevation view of the vibration isolator in FIG. 2.
Figure 4:
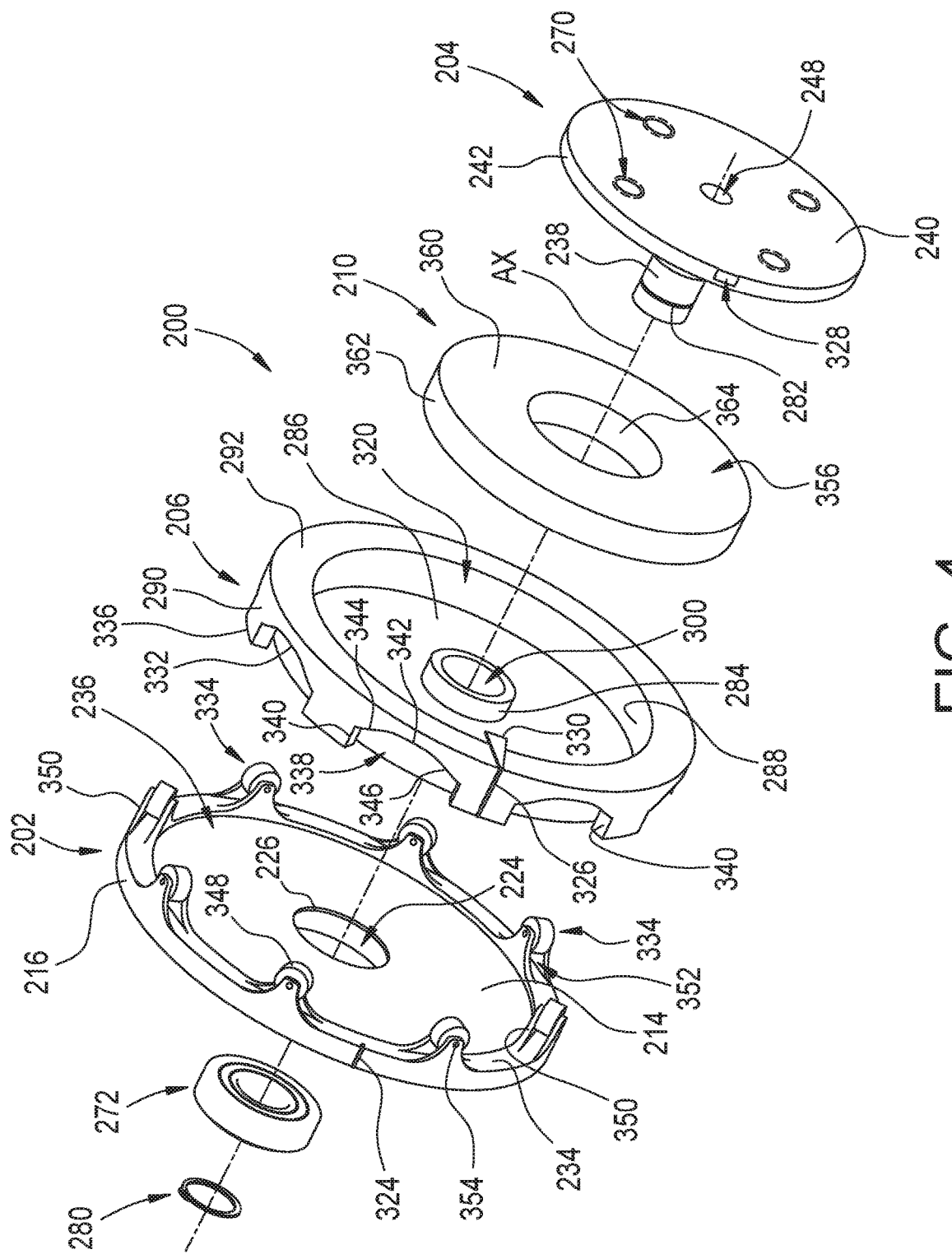
FIG. 4 is an exploded view of the vibration isolator in FIGS. 2 and 3.
Figure 5:
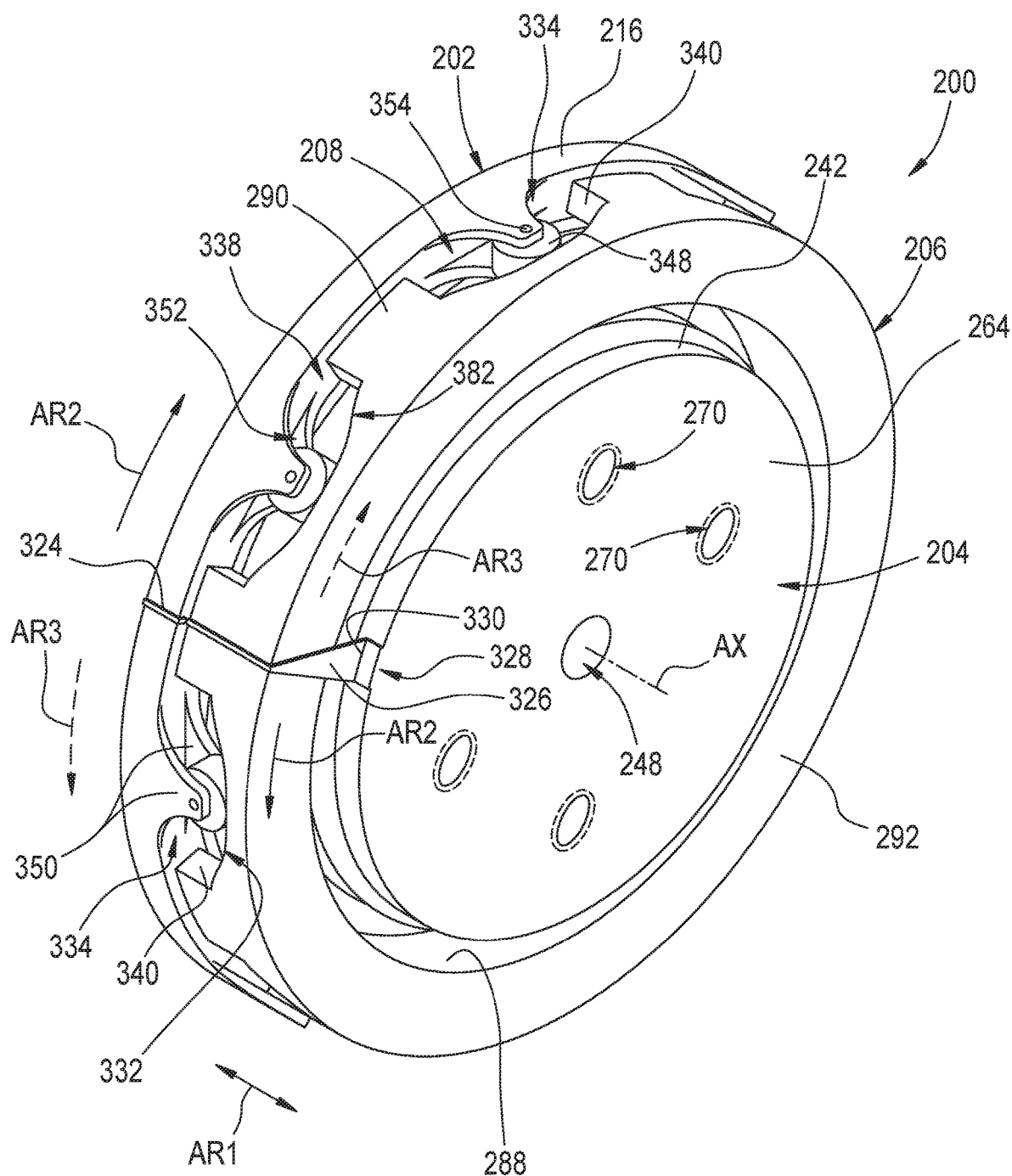
FIG. 5 is a front perspective view of the vibration isolator in FIGS. 2-4 shown in a first condition of operation.
Figure 6:
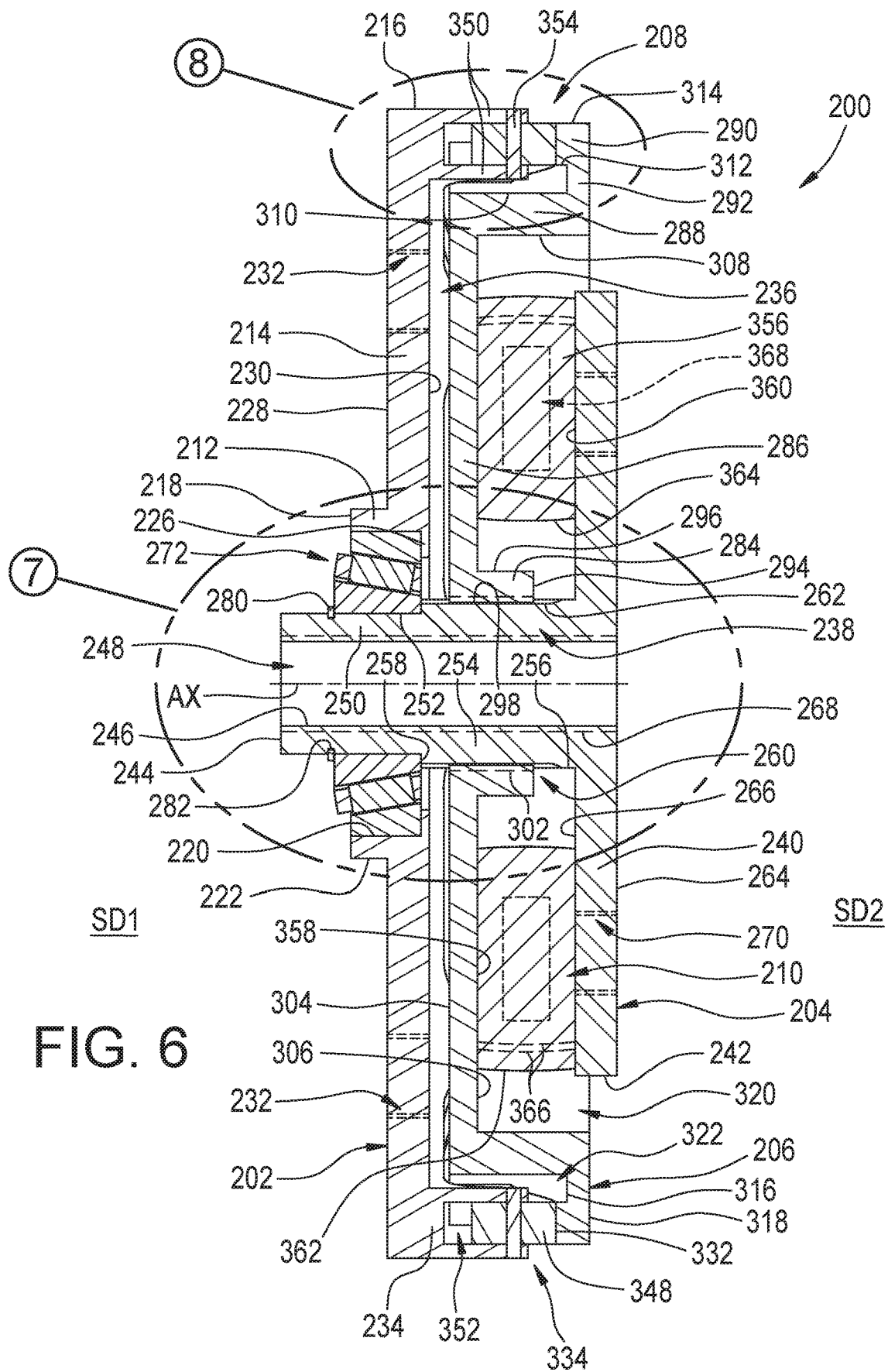
FIG. 6 is a cross-sectional side view of the vibration isolator in FIGS. 2-5 taken from along line 6-6 in FIG. 2 and shown in the first condition of operation.
Figure 8:
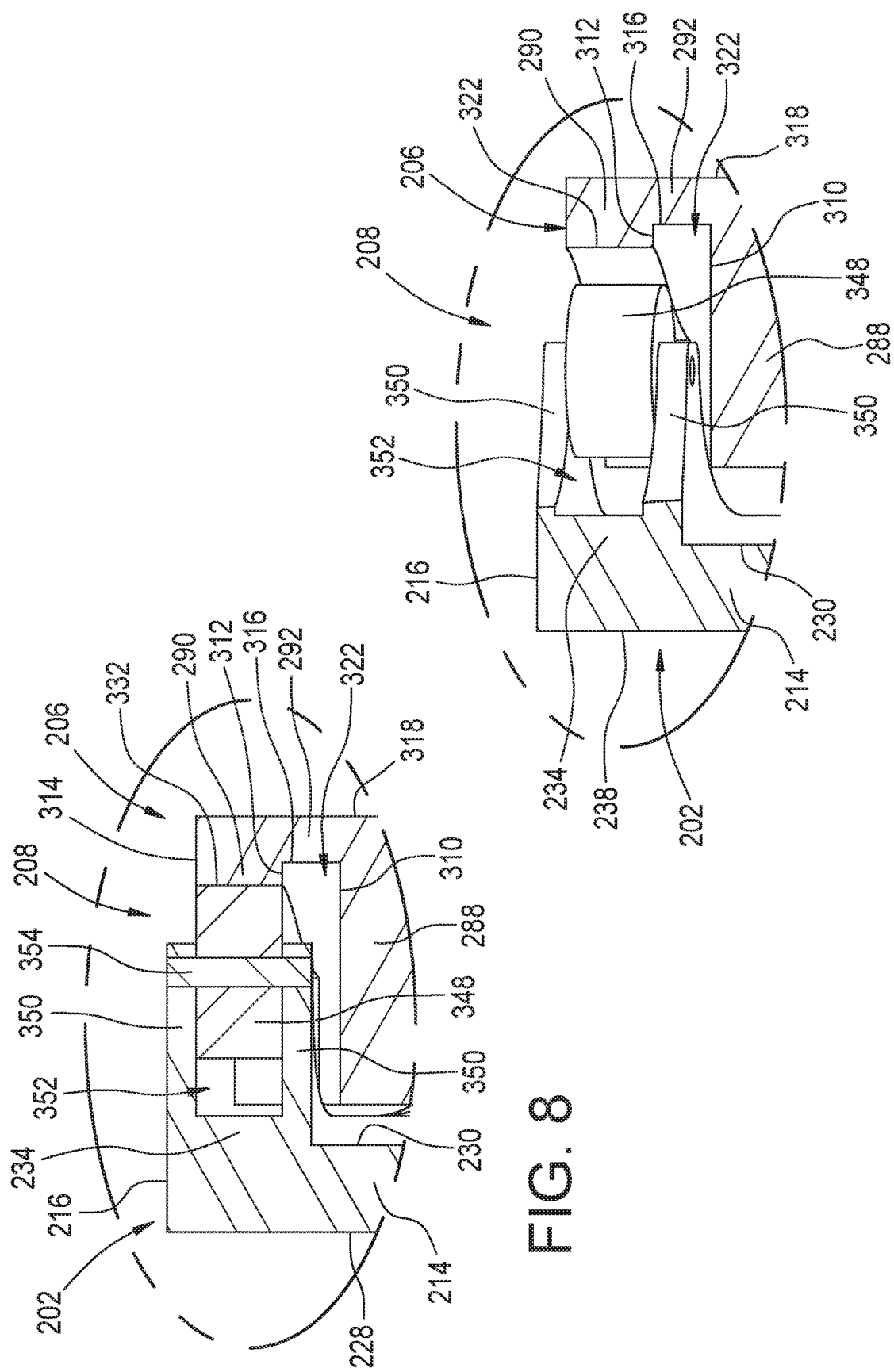
FIG. 8 is an enlarged view of the portion of the vibration isolator identified as Detail 8 in FIG. 6.
Figure 9:
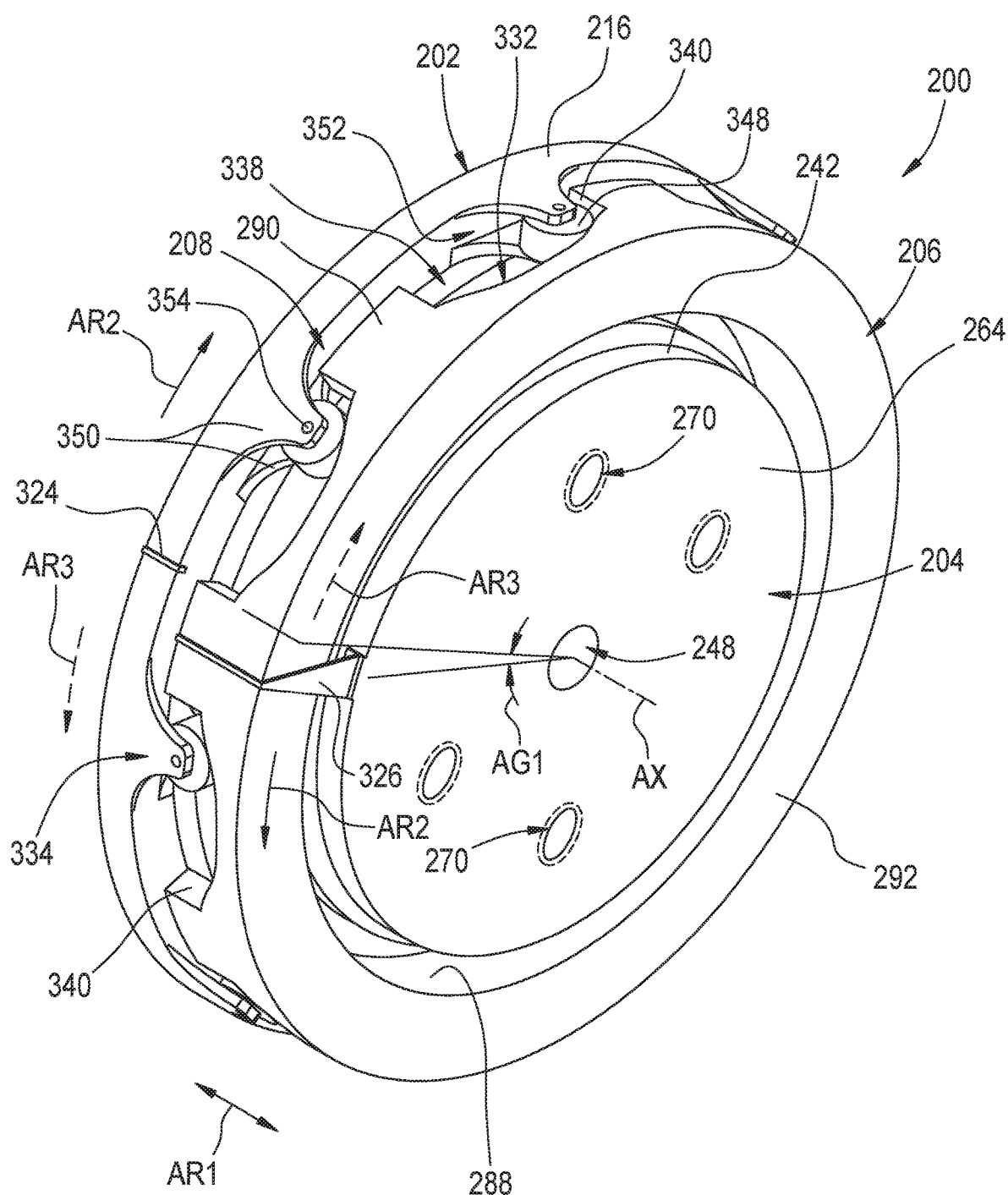
FIG. 9 is a front perspective view of the vibration isolator in FIGS. 2-6 shown in a second condition of operation.
Figure 10:
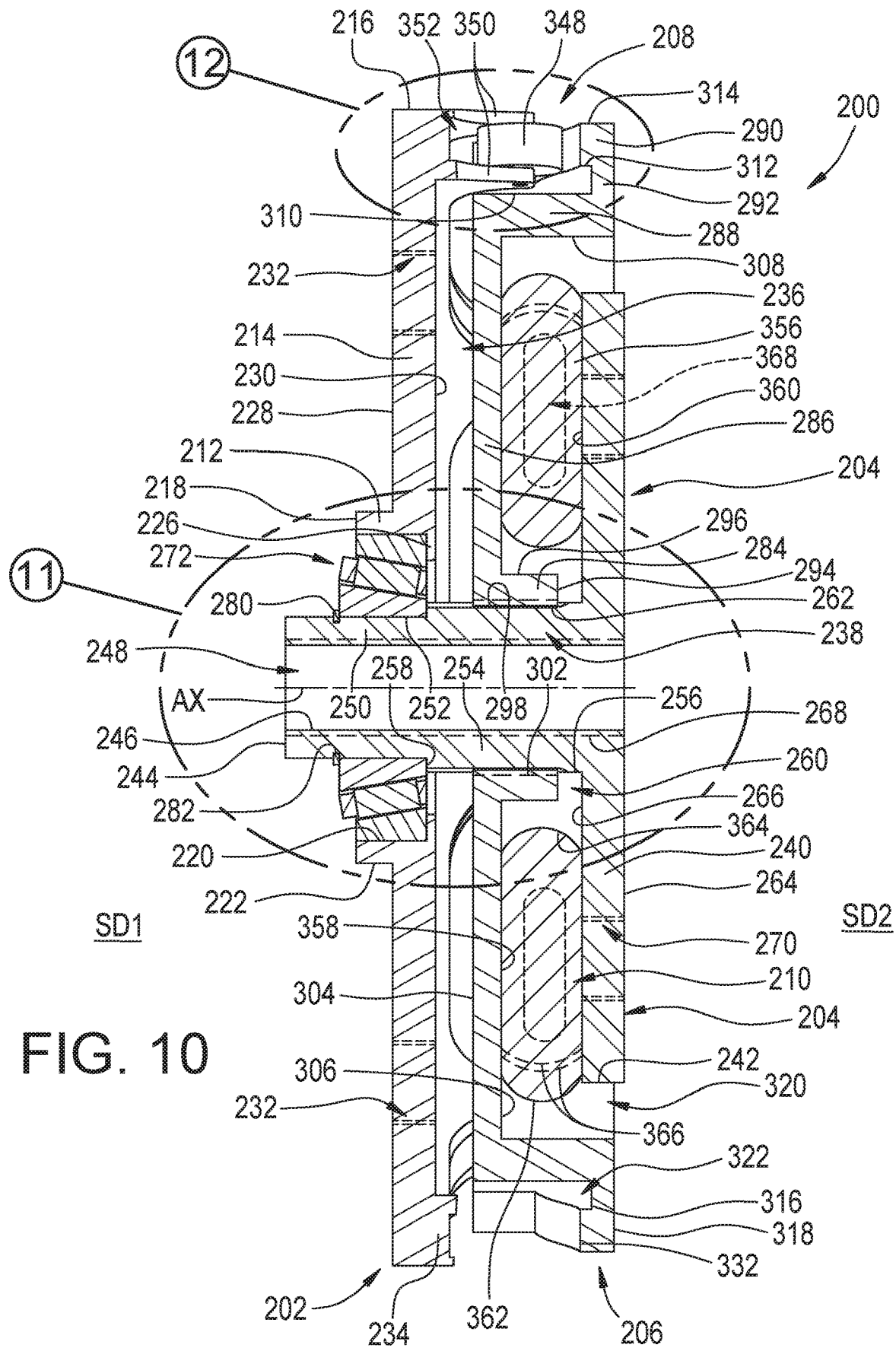
FIG. 10 is a cross-sectional side view of the vibration isolator shown in the second condition of operation.

One example of a vibration isolator in accordance with the subject matter of the present disclosure, such as may be suitable for use as vibration isolator 106 in FIG. 1, for example, is identified as a vibration isolator (or torsional vibration isolator) 200 in FIGS. 2-12. Torsional vibration isolator 200 can have a longitudinal axis AX and can include an end member 202, an end member 204 and an intermediate member 206 that is operatively disposed between end members 202 and 204. In an assembled condition, torsional vibration isolator 200 can include axially-opposed sides, which are represented in FIGS. 3, 6 and 10 by reference numbers SD1 and SD2. In some cases, one or more securement features can be accessible from along either or both of sides SD1 and SD2, such as may be suitable for operatively connecting one or more components (e.g., end member 202 and/or end member 204) to an associated rotational motion source (e.g., driving component 102) and/or an associated rotational motion target (e.g., driven component 104).

A torsional vibration isolator in accordance with the subject matter of the present disclosure can also include a system operatively disposed between the intermediate member and one of the end members. Such a system can be operative to convert rotation of the intermediate member and one of end members relative to the other one of the end members into axial displacement of the intermediate member relative to the two end members. It will be appreciated that such a system can be of any suitable type, kind, configuration and/or construction and that the one or more components thereof can be arranged in any suitable manner. For example, torsional vibration isolator 200 includes a rotational motion-to-axial motion conversion system 208 that is operatively disposed between end member 202 and intermediate member 206. In the exemplary arrangement shown in FIGS. 2-12, for example, system 208 is of a type and kind commonly referred to as an end cam and follower arrangement. It will be appreciated, however, that other configurations and/or arrangements of other types and kinds could alternately be used.

Additionally, a torsional vibration isolator in accordance with the subject matter of the present disclosure can include at least one axially-acting element operatively disposed between the intermediate member and at least one of the end members. The at least one axially-acting element can be oriented and/or otherwise arranged to influence movement of the intermediate member in an axial direction. In some cases, the at least one axially-acting element can, optionally, include a damping element operative to damp or otherwise dissipate kinetic energy acting on the intermediate member. In other cases, the at least one axially-acting element can, additionally or in the alternative, include a biasing element operative to bias or otherwise urge components, features and/or elements of a rotational motion-to-axial motion conversion system (e.g., system 208) into engagement with one another. In still other cases, the at least one axially-acting element can include one or more biasing elements and one or more damping elements in any suitable combination. In the arrangement shown in FIGS. 2-12, for example, torsional vibration isolator 200 includes a biasing element 210 that is operatively disposed between end member 204 and intermediate member 206. It will be appreciated, however, that other configurations and/or arrangements could alternately be used.

As indicated above, it will be appreciated that a torsional vibration isolator in accordance with the subject matter of the present disclosure can include end members and one or more intermediate members of any suitable size, shape, construction, configuration and/or arrangement. As one non-limiting example, end member 202 is shown in FIGS. 2-12 as having an axis AX as well as an outboard side (not numbered) disposed toward side SD1 of the torsional vibration isolator and an inboard side (not numbered) disposed toward side SD2 of the torsional vibration isolator. End member 202 can include a bearing support wall 212 and a plate wall 214 that extends radially outward from along the bearing support wall toward an outer peripheral surface 216.

Bearing support wall 212 can extend in a generally axial direction from an end surface 218 disposed along the outboard side of the end member toward the inboard side of the end member. Bearing support wall 212 can include an inner surface 220 and an outer surface 222 with the inner surface dimensioned to at least partially define a passage or opening 224 (FIG. 4) that extends at least partially through end member 202. In some cases, an inner support wall 226 can extend in a radially inward direction from along bearing support wall 212 into passage 224. If provided, inner support wall 226 can include a surface (not numbered) disposed in facing relation to the outboard side (e.g., toward side SD1) of the end member and can at least partially form a recess or seat (not numbered) dimensioned to at least partially receive an associated bearing element, such as has been described hereinafter, for example.

Plate wall 214 can extend radially outward from along bearing support wall 212 toward outer peripheral surface 216 and can include a surface 228 disposed toward the outboard side (e.g., toward side SD1) and a surface 230 disposed toward the inboard side (e.g., toward side SD2). One or more securement features 232 can be accessible from on or along surface 230 of plate wall 214, such as may be suitable for securing or otherwise operatively connecting end member 202 to an associated rotational motion source (e.g., driving component 102) or an associated rotational motion target (e.g., driven component 104). In the arrangement shown in FIGS. 6 and 10, for example, securement features 232 can take the form of threaded passages that extend at least partially into end member 202. It will be appreciated, however, that other configurations and/or arrangements could alternately be used.

In some cases, end member 202 can include one or more additional features and/or devices. As identified in FIG. 8, for example, end member 202 can include an outer peripheral wall 234 that projects outward in a generally axial direction from along surface 230 of plate wall 214. If provided, outer peripheral wall 234 can at least partially define a cavity or recess 236 (FIG. 4) extending into end member 202 from along the inboard side thereof. In a preferred arrangement, recess 236 can be dimensioned to receive at least a portion of one of more of end member 204, intermediate member 206 and/or one or more other components and/or devices (e.g., biasing elements).

End member 204 is shown in FIGS. 2-12 as having an axis AX as well as an outboard side (not numbered) disposed toward side SD2 of the torsional vibration isolator and an inboard side (not numbered) disposed in facing relation to side SD1 of the torsional vibration isolator. End member 204 can include a central or shaft wall 238 and a plate wall 240 that extends radially outward from along the shaft wall toward an outer peripheral surface 242.

Shaft wall 238 can extend in a generally axial direction from an end surface 244 disposed along the inboard side of the end member toward the outboard side of the end member. Shaft wall 238 can optionally include an inner surface 246 with the inner surface, if provided, dimensioned to at least partially define a passage or opening 248 that extends at least partially through end member 204. In a preferred arrangement, such as is shown in FIGS. 3, 4, 6 and 8, for example, shaft wall 238 can include a wall portion 250 having an outer surface portion 252 and a wall portion 254 having an outer surface portion 256. In some cases, wall portions 250 and 254 can be configured such that outer surface portion 256 has a greater cross-sectional dimension (e.g., diameter) than outer surface portion 252. In such cases, a shoulder surface 258 can be at least partially formed along shaft wall 238 between wall portions 250 and 254. It will be appreciated, however, that other configurations and/or arrangements could alternately be used.

In a preferred arrangement, wall portion 250 and outer surface portion 252 can be dimensioned to receive or otherwise operatively engage an associated bearing element, such as is described hereinafter, for example. Additionally, in a preferred arrangement, wall portion 254 and/or outer surface portion 256 can include one or more features and/or elements suitable for forming an anti-rotation connection 260 with intermediate member 206. As one example, wall portion 254 can include one or more surfaces and/or walls that are arranged to form or otherwise at least partially establish a connection feature of anti-rotation connection 260 having non-circular cross-sectional shape. As one example, wall portion 254 can include a plurality of spline walls and/or spline surfaces, which are represented in FIGS. 6 and 8 by lines 262, that extend radially into and axially along at least a section of wall portion 254.

Plate wall 240 can extend radially outward from along shaft wall 238 toward outer peripheral surface 242 and can include a surface 264 disposed toward the outboard side (e.g., toward side SD2) and a surface 266 disposed toward the inboard side (e.g., toward side SD1). One or more securement features can be provided on or along the end member, such as may be accessible from along side SD2 of torsional vibration isolator 200, for example. Such one or more securement features may be suitable for securing or otherwise operatively connecting end member 204 to an associated rotational motion source (e.g., driving component 102) and/or an associated rotational motion target (e.g., driven component 104). One non-limiting example of a suitable securement feature can include an anti-rotation connection (not identified) having a non-circular cross-sectional shape or profile that is formed along surface 246, such as may be suitable for forming a torque-transmitting connection with an associated shaft or other component, for example. It will be appreciated that such an anti-rotation connection can be formed in any suitable manner, such as by way of one or more spline walls or surfaces, which are represented in FIGS. 6 and 8 by dashed lines 268, that extend radially into and axially along at least a section of shaft wall 238 from along surface 248, for example. As another non-limiting example, a plurality of securement features 270 can take the form of threaded passages that extend at least partially into end member 204, such as from along surface 264 thereof, for example. It will be appreciated, however, that other configurations and/or arrangements could alternately be used.

As indicated above, end members 202 and 204 can be operatively connected with one another such that the end members are maintained in substantially-fixed axial relation to one another while permitting the end members to rotate relative to one another, such as about axis AX, for example. It will be appreciated that the end members can be operatively connected with one another for such operation in any suitable manner and using any suitable configuration and/or arrangement of any combination of one or more components. In some cases, the end members could be maintained in a substantially-fixed axial position relative to one another due to securement of the end members on associated driving, driven and/or other components. In other cases, one or more features of the operative connection between the end member can maintain the end members in a substantially-fixed axial relation to one another.

A wear-reducing and/or friction-reducing element of any suitable type, kind and/or construction can be operatively disposed between end members 202 and 204 in any suitable manner. As one example, a bushing or plain bearing that is at least partially formed from a wear-reducing and/or friction-reducing material could be disposed between the end members in a manner that permits relative rotation between the end members. As another example, a bearing or bearing assembly 272 can be secured between the end members and can include an inner bearing element 274, an outer bearing element 276 and a plurality of rolling elements 278 disposed therebetween. As shown in FIGS. 6, 7, 10 and 11, inner bearing element 274 is disposed along outer surface portion 252 of wall portion 250 of end member 204. The inner bearing element can be captured on or along wall portion 250 in any suitable manner. For example, inner bearing element 274 can be disposed in abutting engagement with shoulder surface 258 and secured in position along wall portion 250 by way of base device, such as a retaining ring 280 that is at least partially received within an annular groove 282 that extends radially inward into wall portion 250, for example.

Outer bearing element 276 is shown in FIGS. 6, 7, 10 and 11 as being disposed along inner surface 220 of bearing support wall 212 and can be secured thereon along in any suitable manner. For example, the outer bearing element can be press-fit into the opening or passage through end member 202 and position in abutting engagement with the surface of inner support wall 226 that faces the outboard side (e.g., side SD1) of vibration isolator 200. End members 202 and 204 can be position relative to one another such that inner bearing element 274 and outer bearing element 276 are axially coextensive with one another. Rolling elements 278 can be disposed between the inner and outer bearing elements in a conventional manner to permit wear-reduced and/or friction-reduced movement of the inner and outer bearing elements relative to one another. It will be appreciated that rolling elements of any suitable type, kind and/or construction can be used, such as spherical ball bearings, cylindrical roller bearings and/or tapered roller bearings, for example.

As indicated above, intermediate member 206 is axially positioned between end members 202 and 204, and is operatively connected in rotationally-fixed relation to one of the end members in a manner that permits axial displacement of the intermediate member relative to the end members during use of vibration isolator 200. It will be appreciated that the intermediate member can be of any suitable size, shape, construction and/or configuration. As one example, intermediate member 206 is shown in FIGS. 2-12 as having an axis AX and including a central wall portion 284 and a plate wall portion 286 that extends in a radially outward direction from along the central wall portion. An inner peripheral wall portion 288 is disposed radially outward of plate wall portion 286 and an outer peripheral wall portion 290 is disposed radially outward of the inner peripheral wall portion with a connecting wall portion 292 extending therebetween. It will be appreciated, however, that other configurations and/or constructions could alternately be used.

Central wall portion 284 is shown in FIGS. 6, 7, 10 and 11 as extending from an end surface 294, which is disposed toward side SD2, in an axial direction toward plate wall portion 286. The central wall portion can include an outer surface (or outer surface portion) 296 and an inner surface (or inner surface portion) 298 that at least partially defines a passage or opening 300 (FIG. 4) that extends at least partially through intermediate member 206. As indicated above, in a preferred arrangement, central wall portion 284 and/or inner surface 298 thereof can include one or more features and/or elements suitable for forming anti-rotation connection 260 with end member 204. As one example, wall portion 284 can include one or more surfaces and/or walls that are arranged to form or otherwise at least partially establish a connection feature of anti-rotation connection 260 having non-circular cross-sectional shape. As one example, wall portion 284 can include a plurality of spline walls and/or spline surfaces, which are represented in FIGS. 6, 7, 10 and 11 by dashed lines 302, that extend outward into and axially along at least a section of wall portion 284 and correspond in mating relation to spline walls and/or spline surfaces 262 of wall portion 254 of end member 204.

Plate wall portion 286 extends radially outward from along central wall portion 284, and includes a surface 304 disposed toward side SD1 and a surface 306 disposed toward side SD2. Inner peripheral wall portion 288 extends axially from along plate wall portion 286 in a direction toward side SD2, and can include an inner surface 308 facing toward central wall portion 284 and an outer surface 310 facing away from the central wall portion. Outer peripheral wall portion 290 is spaced radially outward from inner peripheral wall portion 288, and includes an inner surface 312 disposed in spaced relation to outer surface 310 of the inner peripheral wall and an outer surface 314 that can, in some cases, form an outermost peripheral extent of intermediate member 306. Connecting wall portion 292 can extend between and operatively interconnect inner and outer peripheral wall portions 288 and 290. Additionally, connecting wall portion 292 can be disposed in axially-offset relation to plate wall portion 286, and can include a surface 316 facing toward side SD1 and a surface 318 facing toward side SD2.

Intermediate member 206 can, optionally, include a recess or cavity 320 that extends into intermediate member 206, such as from along side SD2 of the vibration isolator. If provided, recess 320 can, in some cases, be at least partially defined by one or more of surfaces 296, 306 and/or 308, and can include an open end (not numbered) facing toward side SD2. Furthermore, intermediate member 206 can, optionally, include a recess or cavity 322 that extends into the intermediate member, such as from along side SD1 of torsional vibration isolator 200. If provided, recess 322 can, in some cases, be at least partially defined by one or more of surfaces 310, 312 and/or 316.

As indicated above, end member 204 and intermediate member 206 are operatively engaged with one another by way of at least anti-rotation connection 260, which can permit intermediate member 206 to move axially relative to end member 204 as well as to end member 202, as is represented in FIGS. 5 and 9 by arrow AR1. Additionally, anti-rotation connection 260 operates to maintain end member 204 and intermediate member 206 in a substantially-fixed rotational orientation relative to one another. As such, end member 204 and intermediate member 206 are operatively engaged with end member 202 such that end member 204 and intermediate member 206 can rotate about axis AX relative to end member 202, as is represented in FIGS. 5 and 9 by rotation arrows AR2 and rotation arrows AR3.

In some cases, torsional vibration isolator 200 can, optionally, include one or more alignment indicators suitable for visually indicating a relative axial and/or rotational orientation of one or more components of the vibration isolator relative to one or more other components of the vibration isolator. For example, end member 202 is shown as including an alignment indicator 324 and intermediate member 206 is shown as including an alignment indicator 326. In some cases, a portion of the alignment indicator of the intermediate member can be connected to or otherwise operatively engage end member 204. For example, plate wall 240 of end member 204 is shown as including a recess 328 extending radially into the end member from along outer peripheral surface 242 with a distal edge 330 or other portion of alignment indicator 326 extending into recess 328. In a preferred arrangement, alignment indicator 326 is fixedly attached to the intermediate member but slidably engaged with end member 204 such that the distal edge and/or other portion of the alignment indicator disposed within recess 328 can move with intermediate member 206 relative to end member 204.

As indicated above, torsional vibration isolator 200 includes rotational motion-to-axial motion conversion system 208 that is operatively disposed between end member 202 and intermediate member 206. Conversion system 208 functions to convert rotation of end member 202 relative to end member 204 and intermediate member 206 into axial displacement of the intermediate member relative to end members 202 and 204. It will be appreciated that the conversion system can include any suitable combination of features and/or components of any suitable type, kind and/or construction. For example, the conversion system can include one or more non-planar surfaces and one or more features and/or components that engage and follow the one or more non-planar surfaces.

In the arrangement shown in FIGS. 2-12, for example, conversion system 208 is shown as including a plurality of non-planar or cam surfaces 332 that are disposed in peripherally spaced relation to one another about vibration isolator 200. Conversion system 200 is also shown as including a plurality of cam followers 334 that are disposed in peripherally spaced relation to one another about the vibration isolator. In a preferred arrangement, cam surfaces 332 and cam followers 334 can be peripherally spaced from one another about axis AX such that, in an assembled condition, one or more of the cam surfaces and a corresponding one or more of the cam followers are disposed in operative engagement with one another. It will be appreciated that the opposing features, elements and/or components of conversion system 208 can be operatively disposed between the intermediate member and one of the end members (e.g., end member 202) in any suitable configuration and/or arrangement, and with any combination of one or more cam surfaces and one or more cam followers disposed on, along or otherwise between the intermediate member and the end members. As one example, all of the cam surfaces could be disposed on or along the end member with all of the cam followers disposed on or along the intermediate member. As another example, all of the cam surfaces could be disposed on or along the intermediate member with all of the cam followers disposed on or along the end member. As a further example, a combination of cam surfaces and cam followers could be disposed along the intermediate member with a corresponding combination of cam surfaces and cam followers disposed along the end member.

It will be appreciated that the cam surfaces can be formed on or along the intermediate member and/or end member in any suitable manner. As one example, cam surfaces 332 can be formed on or along outer peripheral wall portion 290. In some cases, the cam surfaces can at least partially form a distal extent of the outer peripheral wall portion. In other cases, outer peripheral wall portion 290 can extend from along connecting wall 292 in an axial direction toward a distal surface 336, which can be approximately planar. In such cases, intermediate member 206 can include cam recesses 338 that extend axially into the outer peripheral wall portion from along distal surface 336. Cam recesses 338 can include opposing side walls or surfaces 340 that are spaced apart from one another with cam surfaces 332 forming the bottom or axial extent of cam recesses 338.

Cam surfaces 332 can have a non-linear cross-sectional profile with a root surface portion 342 having an approximately planar profile segment, a first inclined surface portion 344 that extends in a first circumferential direction from along the root surface portion, and a second inclined surface portion 346 that extends from along the root surface portion in a second circumferential direction that is opposite the first circumferential direction. In a preferred arrangement, first and second inclined surface portions 344 and 346 project axially from along root surface portion 342 in a direction toward distal surface 336 and/or end member 202. In a preferred arrangement, first and second inclined surface portions 344 and 346 extend peripherally from root surface portion 342 toward side surfaces 340. In some cases, side surfaces 340 can extend in an approximately axial direction dimensioned to inhibit rotational displacement of the cam followers beyond the first and second inclined surfaces.

It will be appreciated that the cam followers can be formed on or along the intermediate member and/or one or more of the end members in any suitable manner. As one example, the cam followers can be formed as wall portions of the intermediate member and/or end member that slidingly engage the corresponding cam surfaces. As another example, cam followers 334 can include one or more rolling elements, such as may assist in reducing inefficiencies and/or wear due to sliding engagement between abutting surfaces, for example. In the arrangement shown in FIGS. 2-12, for example, cam followers 334 include rolling elements 348 that are supported on or along outer peripheral wall 234 of end member 202 in a suitable manner. For example, support wall portions 350 can project from along outer peripheral wall 234 in an axial direction. The support wall portions can be spaced from one another such that a groove or slot 352 is disposed therebetween. One of rolling elements 348 can be disposed within groove 352 and retained on or along support wall portions 350 in a suitable manner, such as by way of a support pin 354 or other securement device, for example. It will be appreciated, however, that other configurations and/or arrangements could alternately be used.

As discussed above, during use of torsional vibration isolator 200, end member 202 is rotatable relative to intermediate member 206 and end member 204, which are operatively connected by anti-rotation connection 260 such that intermediate and end members 206 and 204 co-rotate relative to end member 202. Vibration isolator 200 is shown in FIGS. 2, 3 and 5-8 in a neutral rotational orientation in which alignment indicators 324 and 326 are disposed in approximate alignment with one another. In such an orientation, cam followers 334 are, in a preferred arrangement, disposed in an approximately centered position on or along root surface portion 342 of cam surfaces 332.

Figure 11:
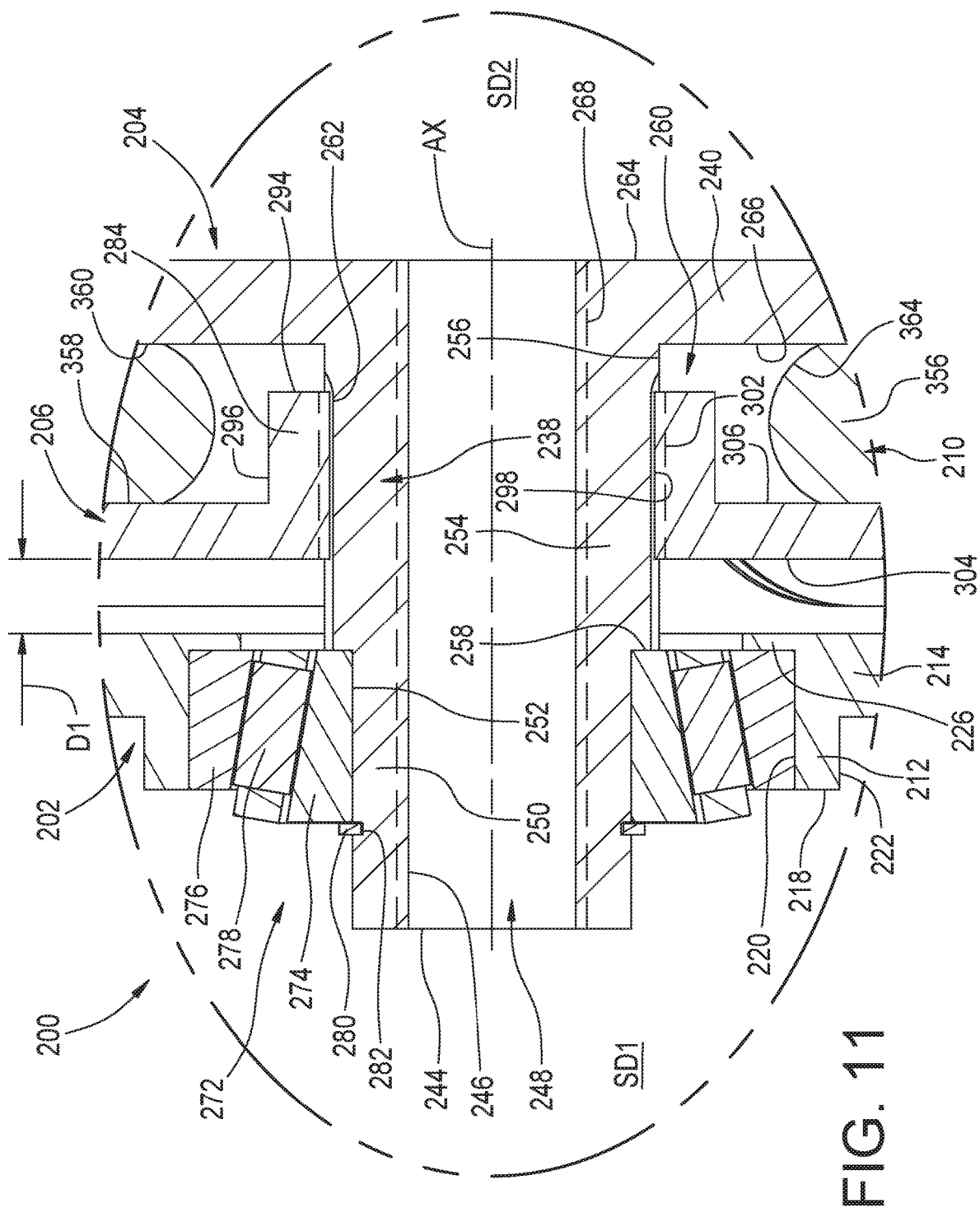
FIG. 11 is an enlarged view of the portion of the vibration isolator identified as Detail 11 in FIG. 10.

As end member 202 rotates relative to intermediate member 206 and end member 204, such as is represented in FIGS. 5 and 9 by arrows AR2 and/or AR3, for example, vibration isolator 200 reaches rotational orientation under which end members 202 and 204 are rotationally displaced through a non-zero included angle, such as is represented in FIG. 9 by angular reference dimension AG1, for example. As the vibration isolator moves from the neutral orientation toward a rotational orientation, cam followers 334 are displaced along root surface portion 342 and into engagement with one of inclined surface portions 344 and/or 346. As cam followers 334 are displaced along one of the inclined surface portions toward a corresponding one of side surfaces 340, the profile or contour of the inclined surface portion forces intermediate member 206 to be displaced in a direction away from end member 202 and toward end member 204, such as is represented in FIG. 11 by reference dimension D1. Under such conditions, the one or more axially-engaging elements of the vibration isolator, which can include one or more biasing elements, can be changed from a first potential energy condition or state to a second potential energy condition or state that is greater (i.e., has greater stored potential energy) than the first potential energy condition, such as by being tensioned and/or compressed due to the displacement of intermediate member 206 relative to end members 202 and 204.

Figure 7:
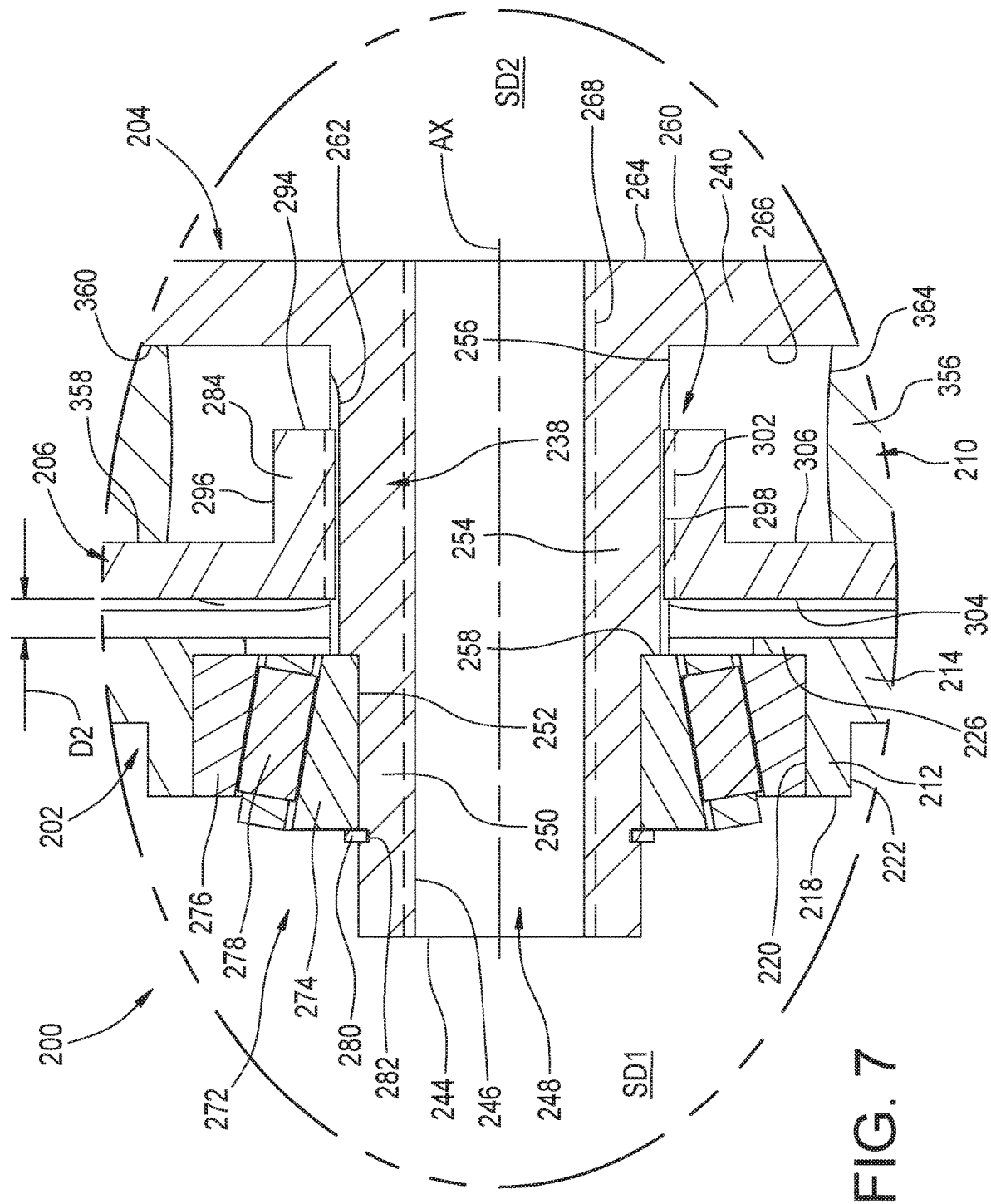
FIG. 7 is an enlarged view of the portion of the vibration isolator identified as Detail 7 in FIG. 6.

As the vibration isolator moves from a rotational orientation back toward a neutral orientation, cam followers 334 are displaced along one of the inclined surface portions 344 and/or 346 toward root surface portion 324. As the cam followers are displaced along the inclined surface portions, the profile or contour of the inclined surface portions allows intermediate member 206 to be displaced or otherwise move away from end member 204 and toward end member 202, such as is represented in FIG. 7 by reference dimension D2, which is less than reference dimension D1. Under such conditions, the one or more axially-engaging elements of the vibration isolator, which can include one or more biasing elements, can revert from the second potential energy condition to the first potential energy condition.

Additionally, or in the alternative, the one or more axially-engaging elements can include one or more damping elements that operate or otherwise function to dissipate kinetic energy associated with movement of intermediate member 206 in either or both axial directions. As indicated above, anti-rotation connection 260 retains intermediate member 206 and end member 204 in a substantially-fixed rotational orientation relative to one another but permits the intermediate member to undergo axial displacement relative to end members 202 and 204, which are preferably maintained in a substantially-fixed axial relationship relative to one another.

As indicated above, the one or more axially-engaging elements can, in some cases, include one or more damping elements operative to dissipate kinetic energy acting on torsional vibration isolator 200. It will be appreciated that the one or more damping elements, if included, can be of any suitable type, kind, construction and/or configuration. For example, the one or more damping elements could include any one or more of constructions, such as piston/cylinder constructions, for example, that utilize hydraulic fluid, pressurized gas and/or other fluids as the working medium. As another example of a suitable construction, one or more flexible walls that at least partially define two or more fluid chambers and permit transfer of liquid and/or pressurized gas as a damping element. As a further example, one or more electromagnetic damping elements could be used.

Additionally, or in the alternative, the one or more axially-engaging elements can include one or more biasing elements that are operatively connected or otherwise disposed between one of the end members and the intermediate member. For example, the one or more biasing elements could be used that can be operatively connected in tension between end member 202 and intermediate member 206 could be used. As another example, one or more biasing elements that are operatively disposed in compression between end member 204 and intermediate member 206 could be used. As a further example, any combination of two or more biasing elements used in tension and/or compression between the intermediate member and one or more of end members 202 and/or 204 could be used.

It will be appreciated that the one or more biasing elements can be formed in any suitable manner and from any suitable material or combination of materials. For example, the one or more biasing elements can take the form of metal coil springs, metal leaf springs, conical disc springs (e.g., Belleville washers) and/or metal torsional springs. Additionally, the one or more biasing elements can include any number of one or more negative stiffness elements in operative combination with any number of one or more positive stiffness elements. As another example, as is identified in FIGS. 6 and 10, biasing element 210 can include a polymeric spring body 356, such as may be at least partially formed from a thermoplastic elastomer or other elastomeric material (e.g., rubber). Spring body 356 is shown as including a surface 358 disposed toward surface 306 of plate wall portion 286 and a surface 360 disposed opposite surface 358 and in facing relation to surface 266 of plate wall portion 240. Spring body 356 is also shown as including an outside surface 362 and an opposing inside surface 364 that at least partially defines an opening or passage (not numbered) extending through the spring body. In a preferred arrangement, the opening or passage is dimensioned to receive one or more of shaft wall 238 and/or central wall portion 284. In some cases, one or more reinforcing layers or plies 366 can, optionally, be at least partially embedded within spring body 356. If included, reinforcing plies 366 can inhibit or at least reduce radially-outward expansion of spring body 356 during compression, such as is illustrated in FIG. 10, for example. Though not shown in FIGS. 6 and 10, one or more reinforcing layers or plies could additionally, or in the alternative, be disposed toward inside surface 364 and can inhibit or at least reduce radially-inward expansion of the spring body during compression.

In some cases, the one or more biasing elements can, optionally, be adjustable, such as by way of increasing and/or decreasing the initial spring force and/or overall spring rate of the biasing elements. It will be appreciated that such adjustability can be achieved in any suitable manner. As one example, spring body 356 of biasing element 210 can at least partially define a spring chamber or cavity 368 that is can receive and retain a quantity of pressurized gas for an extended period of time (e.g., days, weeks, months or years). In some cases, the quantity and/or pressure of gas contained within the spring chamber can be increased and/or decreased to adjust the initial spring force and/or spring rate of the biasing element. It will be appreciated, that pressurized gas can be transferred into and/or out of the spring chamber in any suitable manner, such as by way of pressurized gas system 110 and connection 112 in FIG. 1, for example.

Figure 13:
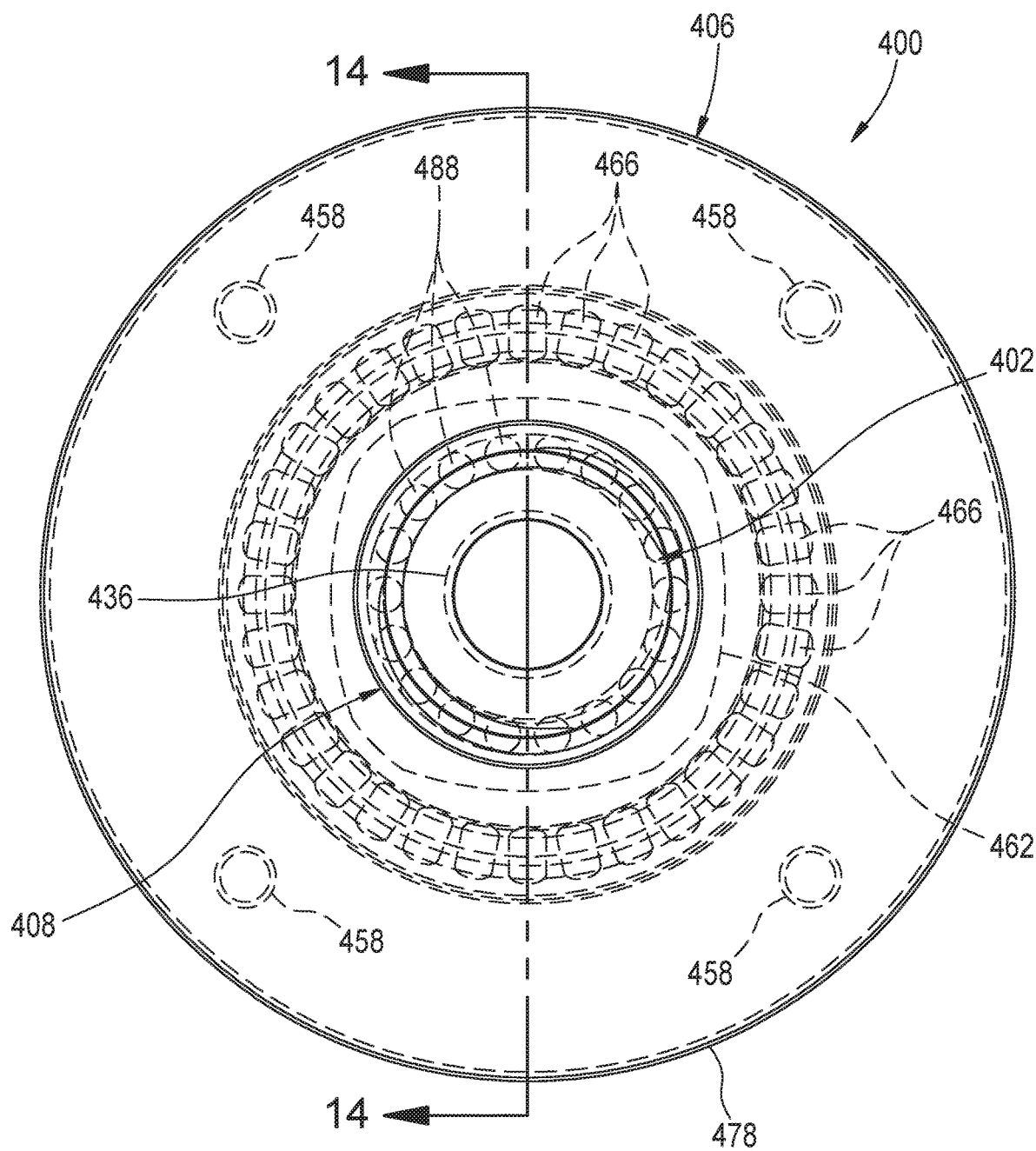
FIG. 13 is a front elevation view of another example of a vibration isolator in accordance with the subject matter of the present disclosure.
Figure 14:
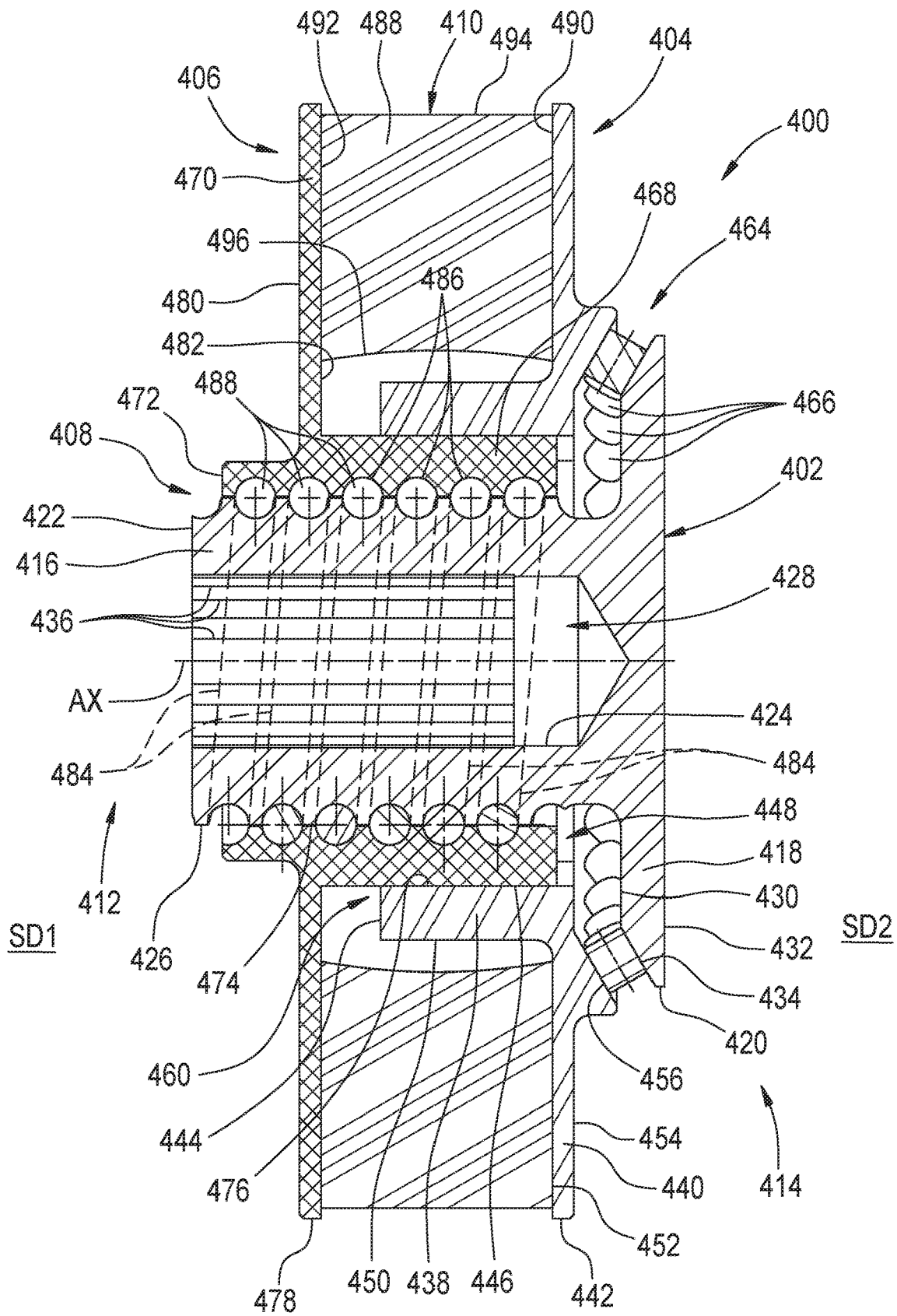
FIG. 14 is a cross-sectional side view of the vibration isolator in FIG. 13 taken from along line 14-14 in FIG. 13.

Another example of a vibration isolator in accordance with the subject matter of the present disclosure, such as may be suitable for use as vibration isolator 106 in FIG. 1, for example, is identified as a vibration isolator (or torsional vibration isolator) 400 in FIGS. 13 and 14. Torsional vibration isolator 400 can have a longitudinal axis AX and can include an end member 402, an end member 404 and an intermediate member 406 that is operatively disposed between end members 402 and 404. In an assembled condition, torsional vibration isolator 400 can include axially-opposed sides, which are represented in FIG. 13 by reference numbers SD1 and SD2. In some cases, one or more securement features can be accessible from along either or both of sides SD1 and SD2, such as may be suitable for operatively connecting one or more components (e.g., end member 402 and/or end member 404) to an associated rotational motion source (e.g., driving component 102) and/or an associated rotational motion target (e.g., driven component 104).

A torsional vibration isolator in accordance with the subject matter of the present disclosure can also include a system operatively disposed between the intermediate member and one of the end members. Such a system can be operative to convert rotation of the intermediate member and one of end members relative to the other one of the end members into axial displacement of the intermediate member relative to the two end members. It will be appreciated that such a system can be of any suitable type, kind, configuration and/or construction and that the one or more components thereof can be arranged in any suitable manner.

For example, torsional vibration isolator 400 includes a rotational motion-to-axial motion conversion system 408 that is operatively disposed between end member 402 and intermediate member 406. In the exemplary arrangement shown in FIGS. 13 and 14, for example, system 408 is of a type and kind that may be referred to as a ball screw-style connection. It will be appreciated, however, that other configurations and/or arrangements of other types and kinds could alternately be used.

Additionally, a torsional vibration isolator in accordance with the subject matter of the present disclosure can include at least one axially-acting element operatively disposed between the intermediate member and at least one of the end members. The at least one axially-acting element can be oriented and/or otherwise arranged to influence movement of the intermediate member in an axial direction. In some cases, the at least one axially-acting element can, optionally, include a damping element operative to damp or otherwise dissipate kinetic energy acting on the intermediate member. In other cases, the at least one axially-acting element can, additionally or in the alternative, include a biasing element operative to bias or otherwise urge components, features and/or elements of a rotational motion-to-axial motion conversion system (e.g., system 408) into engagement with one another. In still other cases, the at least one axially-acting element can include one or more biasing elements and one or more damping elements in any suitable combination. In the arrangement shown in FIGS. 13 and 14, for example, torsional vibration isolator 400 includes a biasing element 410 that is operatively disposed between end member 404 and intermediate member 406. It will be appreciated, however, that other configurations and/or arrangements could alternately be used.

As indicated above, it will be appreciated that a torsional vibration isolator in accordance with the subject matter of the present disclosure can include end members and one or more intermediate members of any suitable size, shape, construction, configuration and/or arrangement. As one non-limiting example, end member 402 is shown in FIGS. 13 and 14 as having an axis AX as well as an end 412 disposed toward side SD1 of the torsional vibration isolator and an end 414 disposed toward side SD2 of the torsional vibration isolator. End member 402 can include a shaft wall 416 and a plate wall 418 that extends radially outward from along the shaft wall toward an outer peripheral edge 420.

Shaft wall 416 can extend in a generally axial direction from an end surface 422 disposed along the outboard side of the end member toward end 414 of the end member, and can be operatively connected with plate wall 418 in any suitable manner. Shaft wall 416 can include an inner surface 424 and an outer surface 426 with the inner surface dimensioned to at least partially define a passage or opening 428 that extends into and at least partially through end member 402, such as from along end 412, for example.

Plate wall 418 can extend radially outward from along shaft wall 416 toward outer peripheral edge 420 and can include a surface 430 disposed toward side SD1 and a surface 432 disposed toward side SD2. In some cases, plate wall 418 can also include a bearing surface 434 extending between surface 432 and outer peripheral edge 420. If provided, bearing surface 434 can be disposed at an angle (e.g., an acute or obtuse angle) relative to surface 432 and/or axis AX. In such case, bearing surface 434 can be dimensioned to engage one or more wear-reducing and/or friction-reducing features and/or elements.

One or more securement features can be accessible from on or along end member 402, such as may be suitable for securing or otherwise operatively connecting end member 402 to an associated rotational motion source (e.g., driving component 102) or an associated rotational motion target (e.g., driven component 104). In the arrangement shown in FIGS. 13 and 14, for example, one or more spline walls or surfaces, which are represented in FIGS. 13 and 14 by lines 436, that extend radially into and axially along at least a section of shaft wall 416, such as from along end surface 422 of end 412, for example. It will be appreciated, however, that other configurations and/or arrangements could alternately be used.

End member 404 is shown in FIGS. 13 and 14 as having an axis AX as well as an outboard side (not numbered) disposed toward side SD2 of the torsional vibration isolator and an inboard side (not numbered) disposed in facing relation to side SD1 of the torsional vibration isolator. End member 404 can include a central or shaft wall 438 and a plate wall 440 that extends radially outward from along the shaft wall toward an outer peripheral surface or edge 442.

Shaft wall 438 can extend in a generally axial direction from an end surface 444 disposed along the inboard side of the end member toward the outboard side of the end member. Shaft wall 438 can include an inner surface 446 with the inner surface, if provided, dimensioned to at least partially define a passage or opening 448 that extends at least partially through end member 404. Shaft wall 438 can also include an outer surface 450 dimensioned such that at least a portion of plate wall 440 extends radially outward beyond the outer surface of shaft wall 438. Plate wall 440 can include a surface 452 disposed in facing relation to side SD1 and a surface 454 disposed in facing relation to side SD2. In some cases, end member 404 can also include a bearing surface 456 disposed along at least a portion of one or more of shaft wall 438 and plate wall 440. If provided, bearing surface 456 can be disposed at an angle (e.g., an acute or obtuse angle) relative to surface 432 and/or axis AX. In such case, bearing surface 434 can be dimensioned to engage one or more wear-reducing and/or friction-reducing features and/or elements.

One or more securement features can be provided on or along end member 404, such as may be accessible from along side SD2 of torsional vibration isolator 400, for example. Such one or more securement features may be suitable for securing or otherwise operatively connecting end member 404 to an associated rotational motion source (e.g., driving component 102) and/or an associated rotational motion target (e.g., driven component 104). One non-limiting example, a plurality of securement features 458 can take the form of threaded passages that extend at least partially into end member 404, such as from along surface 454 thereof, for example. It will be appreciated, however, that other configurations and/or arrangements could alternately be used.

End member 404 can also include one or more features and/or elements suitable for forming an anti-rotation connection 460 with intermediate member 406. It will be appreciated that such an anti-rotation connection can be formed in any suitable manner and through the use of any suitable features and/or elements. As one example, inner surface 446 of shaft wall 438 can be arranged to form or otherwise at least partially establish a connection feature of anti-rotation connection 460 having non-circular cross-sectional shape. In a preferred arrangement, such an anti-rotation connection can be capable of substantially inhibiting relative rotation between end member 404 and intermediate member 406 while permitting relative movement in an axial direction between the intermediate and end members. As one example, such an anti-rotation connection can include one or more spline walls or surfaces (not shown) that can engage corresponding spline walls or surfaces on the intermediate member. As another example, inner surface 446 can include one or more surface portions that together form a non-circular shape, such as is represented in FIG. 13 by dashed line 462, for example.

As indicated above, end members 402 and 404 can be operatively connected with one another such that the end members are maintained in substantially-fixed axial relation to one another while permitting the end members to rotate relative to one another, such as about axis AX, for example. It will be appreciated that the end members can be operatively connected with one another for such operation in any suitable manner and using any suitable configuration and/or arrangement of any combination of one or more components. In some cases, the end members could be maintained in a substantially-fixed axial position relative to one another due to securement of the end members on associated driving, driven and/or other components. In other cases, one or more features of the operative connection between the end member can maintain the end members in a substantially-fixed axial relation to one another.

A wear-reducing and/or friction-reducing element of any suitable type, kind and/or construction can be operatively disposed between end members 402 and 404 in any suitable manner. As one example, a bushing or plain bearing that is at least partially formed from a wear-reducing and/or friction-reducing material could be disposed between the end members in a manner that permits relative rotation between the end members. As another example, a bearing or bearing assembly 464 can be secured between the end members and can include a plurality of rolling elements 466 disposed between end members 402 and 404. In some cases, the bearing elements can be retained within a retainer or cage (not shown) and can be disposed in abutting engagement with the end member, such as along bearing surfaces 434 and 456, for example. In other cases, bearing assembly 464 can include one or more additional components, such as an inner bearing element (not shown) and/or an outer bearing element (not shown), for example. Rolling elements 466 can be disposed between the end member in any suitable manner to permit wear-reduced and/or friction-reduced movement between the end members. It will be appreciated that rolling elements of any suitable type, kind and/or construction can be used, such as spherical ball bearings, cylindrical roller bearings and/or tapered roller bearings, for example.

As indicated above, intermediate member 406 is operatively connected between end members 402 and 404 in rotationally-fixed relation to one of the end members in a manner that permits axial displacement of the intermediate member relative to the end members during use of vibration isolator 400. It will be appreciated that the intermediate member can be of any suitable size, shape, construction and/or configuration. As one example, intermediate member 406 is shown in FIGS. 13 and 14 as having an axis AX and including a central wall 468 and a plate wall 470 that extends in a radially outward direction from along the central wall.

Central wall 468 can extend in a generally axial direction from an end surface 472 disposed along side SD1 of vibration isolator 400, and can be operatively connected with plate wall 470 in any suitable manner. Central wall 468 can include an inner surface 474 and an outer surface 476 with the inner surface dimensioned to at least partially define a passage or opening (not numbered) that extends into and through intermediate member 406. Plate wall 470 can extend radially outward from along central wall 468 toward an outer peripheral edge 478 and can include a surface 480 disposed toward side SD1 and a surface 482 disposed toward side SD2.

In a preferred arrangement, outer surface 476 of central wall 468 of intermediate member 406 and inner surface 446 of shaft wall 438 of end member 404 can together at least partially form anti-rotation connection 460. It will be appreciated that such an anti-rotation connection can be formed in any suitable manner and through the use of any suitable combination of shapes, surfaces, features and/or elements. As such, outer surface 476 of central wall 468 can include a non-circular cross-sectional shape that is preferably cooperative with the shape and/or configuration of inner surface 446 of shaft wall 438. In a preferred arrangement, such an anti-rotation connection can be capable of substantially inhibiting relative rotation between end member 404 and intermediate member 406 while permitting relative movement in an axial direction between the intermediate and end members. As one example, such an anti-rotation connection can include one or more spline walls or surfaces (not shown) that can engage corresponding spline walls or surfaces on the intermediate member. As another example, outer surface 476 and inner surface 446 can include one or more surface portions that together form a non-circular shape, such as is represented in FIG. 13 by dashed line 462, for example.

As discussed above, during use of torsional vibration isolator 400, end member 402 is rotatable relative to intermediate member 406 and end member 404, which are operatively connected by anti-rotation connection 460 such that intermediate and end members 406 and 404 co-rotate relative to end member 402. Vibration isolator 400 is shown in FIGS. 13 and 14 in a neutral rotational orientation.

As indicated above, torsional vibration isolator 400 includes rotational motion-to-axial motion conversion system 408 that is operatively disposed between end member 402 and intermediate member 406. Conversion system 408 functions to convert rotation of end member 402 relative to end member 404 and intermediate member 406 into axial displacement of the intermediate member relative to end members 402 and 404. It will be appreciated that the conversion system can include any suitable combination of features and/or components of any suitable type, kind and/or construction. For example, the conversion system can include one or more non-planar surfaces and one or more features and/or components that engage and follow the one or more non-planar surfaces.

In the arrangement shown in FIGS. 13 and 14, for example, conversion system 408 can include a screw-type connection or interengagement formed between end member 402 and intermediate member 406. As discussed above, end member 404 and intermediate 406 are axially displaceable relative to one another. In this respect, as end member 402 and the combination of co-rotating end member 404 and intermediate member 406 rotate relative to one another, conversion system 408 can generate axial displacement of intermediate member 406 relative to end members 402 and 404. It will be appreciated that such a screw-type connection of conversion system 408 can be provided in any suitable manner and through the use of any suitable combination of features and/or elements. As one example, each of end member 402 and intermediate member 406 could include one or more helical threads that abuttingly interengage one another such that a threaded connection is formed therebetween.

As another example, end member 402 could include one or more helical grooves 484, having an approximately semi-circular cross-sectional shape, formed along outer surface 426 of shaft wall 416. Intermediate member 406 can include a corresponding number of one or more helical grooves 486, having an approximately semi-circular cross-sectional shape, formed along inner surface 474 of central wall 468. End member 402 and intermediate member 406 can be oriented or otherwise positioned relative to one another such that grooves 484 and 486 are disposed in approximate alignment with one another to form an elongated, helical passage. A plurality of bearing elements 488 can be disposed within the elongated helical passage to form a ball screw-style connection between end member 402 and intermediate member 406. Depending upon the size, shape and configuration of the helical passage, the bearing elements and the overall displacement of the intermediate and end members, one or more recirculating features (not shown) can, optionally, be included for transferring the bearing elements into and out of the elongated, helical passage.

Additionally, a torsional vibration isolator in accordance with the subject matter of the present disclosure can include at least one axially-acting element operatively disposed between the intermediate member and at least one of the end members. The at least one axially-acting element can be oriented and/or otherwise arranged to influence movement of the intermediate member in an axial direction. In some cases, the at least one axially-acting element can, optionally, include a damping element operative to damp or otherwise dissipate kinetic energy acting on the intermediate member. In other cases, the at least one axially-acting element can, additionally or in the alternative, include a biasing element operative to bias or otherwise urge components, features and/or elements of a rotational motion-to-axial motion conversion system (e.g., system 408) into engagement with one another. In still other cases, the at least one axially-acting element can, additionally or in the alternative, include one or more biasing elements and one or more damping elements in any suitable combination. In the arrangement shown in FIGS. 13 and 14, for example, torsional vibration isolator 400 includes a biasing element 410 that is operatively disposed between end member 404 and intermediate member 406. It will be appreciated, however, that other configurations and/or arrangements could alternately be used.

As indicated above, the one or more axially-engaging elements can include one or more biasing elements that are operatively connected or otherwise disposed between one of the end members and the intermediate member. For example, the one or more biasing elements can be operatively connected in tension between end member 402 and intermediate member 406 could be used. As another example, one or more biasing elements that are operatively disposed in compression between end member 404 and intermediate member 406 could be used. As a further example, any combination of two or more biasing elements used in tension and/or compression between the intermediate member and one or more of end members 402 and/or 404 could be used.

It will be appreciated that the one or more biasing elements can be formed in any suitable manner and from any suitable material or combination of materials. For example, the one or more biasing elements can take the form of metal coils springs, metal leaf springs, conical disc springs (e.g., Belleville washers) and/or metal torsional springs. Additionally, the one or more biasing elements can include any number of one or more negative stiffness elements in operative combination with any number of one or more positive stiffness elements. As another example, as is identified in FIG. 14, biasing element 410 can include a polymeric spring body 488, such as may be at least partially formed from a thermoplastic elastomer or other elastomeric material (e.g., rubber). Spring body 488 is shown as including a surface 490 disposed toward surface 452 and a surface 492 disposed toward surface 482. Spring body 488 is also shown as including an outside surface 494 and an opposing inside surface 496 that at least partially defines an opening or passage (not numbered) extending through the spring body. In a preferred arrangement, the opening or passage is dimensioned to receive one or more of shaft wall 416, shaft wall 438 and/or central wall 468. In some cases, one or more reinforcing layers or plies (not shown) can, optionally, be at least partially embedded within spring body 488. If included, the reinforcing plies can inhibit or at least reduce radially-outward expansion of spring body 488 during compression.

In some cases, the one or more biasing elements can, optionally, be adjustable, such as by way of increasing and/or decreasing the initial spring force and/or overall spring rate of the biasing elements. It will be appreciated that such adjustability can be achieved in any suitable manner, such as has been described above in connection with spring body 356 of biasing element 210, for example.

A torsional vibration isolator (e.g., vibration isolator 106, 200 and/or 400) in accordance with the subject matter of the present disclosure will convert rotational and/or torsional vibrations into axial vibrations, which can be isolated and/or damped. In some cases, such a torsional vibration isolator can provide vibration damping and/or isolation of vibrations having a lower natural frequency than is currently believed to be known in the art. It will be recognized and appreciated that, in general, a torsional vibration isolator with a lower natural frequency will reduce the transmissibility (gain) of torque oscillations that are transmitted or otherwise passed on to downstream systems and/or components.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas", if used herein, can broadly refer to any gaseous or vaporous fluid. Most commonly, air is used as the working medium of devices, such as those described herein. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A vibration isolator dimensioned for securement between an associated rotational motion source and an associated rotational motion target, said vibration isolator comprising:
   a first end member having a longitudinal axis and a second end member operatively connected to said first end member, said first and second end members supported in a substantially-fixed axial position relative to one another while remaining rotatable relative to one another about said longitudinal axis;
   an intermediate member disposed between and operatively engaging said first and second end members, said intermediate member axially displaceable relative to said first and second end members, said intermediate member operatively connected in a substantially-fixed rotational orientation relative to one of said first end member and said second end member such that said intermediate member and said one of said first end member and said second end member are co-rotatable relative to the other of said first end member and said second end member;
   a rotational-to-axial conversion system including a ball screw drive connection operatively disposed between said intermediate member and the other of said first end member and said second end member such that rotation of said intermediate member and said one of said first end member and said second end member relative to the other of said first end member and said second end member generates axial displacement of said intermediate member relative to said first and second end members; and, at least one biasing element operatively disposed between said intermediate member and said one of said first end member and said second end member to urge said intermediate member in an axial direction relative to the other of said first end member and said second end member.

2. A vibration isolator according to claim 1, wherein said at least one biasing element includes at least one of a metal coil spring, a metal leaf spring, a metal conical disc spring, a metal torsional spring and a polymeric spring body at least partially formed from a quantity of elastomeric material.

3. A vibration isolator according to claim 2, wherein said polymeric spring body includes a spring chamber containing a quantity of pressurized gas.

4. A vibration isolator according to claim 1, wherein said at least one biasing element is operatively connected between said intermediate member and said one of said first and second end members.

5. A vibration isolator according to claim 4, wherein said intermediate member includes flange wall portion extending radially outward to an outer peripheral edge with a first surface portion facing toward said second end member and with said at least one biasing element at least partially disposed along said first surface portion.

6. A vibration isolator according to claim 1, wherein said intermediate member includes a central wall portion, and said ball screw drive connection of said system includes a first helical thread formed along said central wall portion.

7. A vibration isolator according to claim 6, wherein the other of said first end member and said second end member includes a shaft wall portion, and said ball screw drive connection of said system includes a second helical thread formed along said shaft wall portion that is cooperative with said first helical thread.

8. A vibration isolator according to claim 7 further comprising a plurality of ball bearings disposed helically about said longitudinal axis and at least partially within said first and second helical threads.

9. A rotary power transmission comprising:
a rotational motion source and a rotational motion target capable of rotation at an angular speed having a corresponding frequency of vibration; and,
a vibration isolator according to claim 1 operatively connected between said rotational motion source and said rotational motion target with said vibration isolator operative to isolate at least one harmonic of said corresponding frequency of vibration.

10. A rotary power transmission according to claim 9 further comprising a pressurized gas system operative associated with said vibration isolator.

11. A vibration isolator according to claim 1, wherein said one of said first end member and said second end member includes a first central wall portion with a non-circular cross-sectional shape, and said intermediate member includes a second central wall portion that is axially coextensive with said first central wall portion, said second central wall portion including a non-circular cross-sectional shape that is cooperative with said non-circular cross-sectional shape of said first central wall portion establishing said substantially fixed rotational orientation of said intermediate member with said one of said first end member and said second end member.

12. A vibration isolator according to claim 1, wherein said first and second end members each include at least one securement feature formed therealong for operatively connecting said first and second end members to a corresponding one of the associated rotational motion source and the associated rotational motion target.

13. A vibration isolator according to claim 1 further comprising a bearing element operatively disposed between said first and second end members.

14. A vibration isolator dimensioned for securement between an associated rotational motion source and an associated rotational motion target with at least one of the associated rotational motion source and the associated rotational motion target being rotatable at an angular speed having a corresponding frequency of vibration, said vibration isolator comprising:
a first end member having a longitudinal axis and including a shaft wall portion extending axially and a first plate wall portion extending radially outward from along said shaft wall portion toward a first outer peripheral edge;
a second end member operatively connected to said first end member, said second end member supported in a substantially-fixed axial position relative to said first end member while remaining rotatable relative to said first end member, said second end member including a first central wall portion and a second plate wall portion extending radially outward from along said first central wall portion to a second outer peripheral edge, said first central wall portion axially coextensive with said shaft wall portion of said first end member with said second plate wall portion axially offset from said first plate wall portion;
an intermediate member disposed between and operatively engaging said first and second end members, said intermediate member axially displaceable relative to said first and second end members while being operatively connected in a substantially fixed rotational orientation relative to said second end member such that said intermediate member and said second end member are co-rotatable about said longitudinal axis relative to said first end member, said intermediate member including a second central wall portion and a third plate wall portion extending radially outward to a third outer peripheral edge with said second central wall portion extending axially coextensively with said shaft wall portion and said first central wall portion and positioned radially between said shaft wall portion and said first central wall portion;
a rotational-to-axial conversion system including a ball screw drive connection operatively disposed between said intermediate member and said first end member to convert rotation of said intermediate member and said second end member relative to said first end member into axial displacement of said intermediate member relative to said first and second end members; and,
one or more biasing elements operatively disposed between said intermediate member and at least one of said first end member and said second end member to bias said intermediate member in an axial direction toward said first end member, said one or more biasing elements having a spring rate suitable for isolating at least one harmonic of said corresponding frequency of vibration.

15. A vibration isolator according to claim 14, wherein said shaft wall portion of said first end member includes an outer surface portion with a first helical thread extending into said first shaft wall portion from along said outer surface portion.

16. A vibration isolator according to claim 15, wherein said second central wall portion of said intermediate member includes an inner surface portion with a second helical thread extending into said second central wall portion from along said inner surface portion.

17. A vibration isolator according to claim 16, wherein said conversion system includes a plurality of ball bearings disposed helically about said longitudinal axis and at least partially within said first and second helical threads.

18. A vibration isolator according to claim 14, wherein said first end member includes a first central wall portion with a non-circular cross-sectional shape, and said intermediate member includes a second central wall portion that is axially coextensive with said first central wall portion, said second central wall portion including a non-circular cross-sectional shape that is cooperative with said non-circular cross-sectional shape of said first central wall portion establishing said substantially fixed rotational orientation of said first end member and said intermediate member.

19. A vibration isolator according to claim 14, wherein said first and second end members each include at least one securement feature formed therealong for operatively connecting said first and second end members to a corresponding one of the associated rotational motion source and the associated rotational motion target.

20. A vibration isolator according to claim 14 further comprising a bearing operatively disposed between said first and second end members.

* * * * *